United States Patent
Suzuki

(10) Patent No.: US 6,611,262 B1
(45) Date of Patent: Aug. 26, 2003

(54) GENERATION OF A BIT STREAM CONTAINING BINARY IMAGE/AUDIO DATA THAT IS MULTIPLEXED WITH A CODE DEFINING AN OBJECT IN ASCII FORMAT

(75) Inventor: Teruhiko Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/152,003

(22) Filed: Sep. 11, 1998

(30) Foreign Application Priority Data

Sep. 22, 1997 (JP) ............................................. 9-275196

(51) Int. Cl.[7] ............................................. G06T 15/00
(52) U.S. Cl. ..................................................... 345/419
(58) Field of Search ....................... 375/240.26, 240.13; 348/425.1, 425.3; 709/217; 345/419, 440, 619

(56) References Cited

U.S. PATENT DOCUMENTS 6,044,397 A * 3/2000 Eleftheriadis et al. ...... 725/139
6,317,131 B2 * 11/2001 Basso et al. ................. 345/474

FOREIGN PATENT DOCUMENTS

EP        0 753 835        1/1997
EP        0 753 836        1/1997

OTHER PUBLICATIONS

Avaro O et al: "The MPEG–4 Systems and Description Languages: A Way Ahead in Audio Visual Information Representation" Signal Processing. Image Communication, NL, Elsevier Science Publishers, Amsterdam, vol. 9, No. 4, May 1, 1997, pp. 385–431, XP004075337.

Koenen R et al: "MPEG–4: Context and Objectives" Signal Processing. Image Communication, NL, Elsevier Science Publishers, Amsterdam, vol. 9, No. 4, May 1, 1997, pp. 295–304, XP004075332.

Doenges P K et al: "Audio/Video and Synthetic Graphics/Audio for Mixed Media" Signal Processing. Image Communication, NL, Elsevier Science Publishers, Amsterdam, vol. 9, No. 4, May 1, 1997, pp. 433–463, XP004075338.

Mulroy P: "VRML Gets Real the MPEG–4 Way" IEE Colloquium on Teleconferencing Futures, GB, IEE, London, Jun. 17, 1997, pp. 401–404, XP002060164.

* cited by examiner

*Primary Examiner*—Phu K. Nguyen
(74) *Attorney, Agent, or Firm*—Frommer Lawrence & Haug LLP; William S. Frommer; Bruno Polito

(57) ABSTRACT

A system controller directs a storage device to output a scene description data corresponding to a user request signal. A parsing circuit extracts a URL (Uniform Resource Locator) included in the scene description data, and causes storage devices to output elementary stream and object stream corresponding to the URL. After extracting an object descriptor from the object stream, a generator generates an ID of this object descriptor and supplies it to an encoder. Further, the generator adds the ID to the object descriptor and outputs the ID-added object descriptor to a multiplexer. The multiplexer multiplexes the scene description data including the ID that has been converted into binary format, the object descriptor and the elementary streams into a multiplexed stream for output thereof.

50 Claims, 26 Drawing Sheets

FIG.3

```
Movie Texture{
exposedField SFBool loop FALSE
exposedField SFFloat speed 1
exposedFiefd SFTime startTime 0
exposedField SFTime stopTime 0
exposedField SFString URL "http : // serverA / AV_scene.1 / object_file.1"
field SFBool repeatS TRUE
field SFBool repeatT TRUE
eventOut SFFloat duration_changed
eventOut SFBool is Active
}
```

FIG.4

```
Image Texture{
exposedField SFString URL "http : // serverA / AV_scene.1 / object_file.1"
field SFBool repeatS TRUE
field SFBool repeatT TRUE
}
```

FIG.5

Node Syntax

```
class MovieTexture extends Node : bit(7) nodeType=0100011{
    bit(1) is Reused ; // This bit describes whether this node is a
    // reused node or a newly defined one. This is equivalent to USE
    if(isReused) {
        bit(10) nodeID ; // The NodeID to be re-used
    }else {
        bit(7) nodeType ;
        bit(1) is Updatable
        if(isUpdatable){
            bit(10) nodeID ;
        }
        bit(1) endFlag ; // Are there any arguments at all ?
        while (!endFlag){ bit(3)      fieldRef ; // index to the field to be specified below
            switch(fieldRef){
            case 0 :
                    SFBool loop ;
                    break ;
            case 1 :
                    SFFloat speed ;
                    break ;
            case 2 :
                    SFTime startTime ;
                    break ;
            case 3 :
                    SFTime stopTime ;
                    break ;

case 4 :
                    SFObjectID objectDescriptorID ;
                    break ;

case 5 :
                    SFBool repeatS ;
                    break ;

case 6 :
                    SFBool repeatT ;
                    break ;
            }
            bit(1) endFlag ; // Are there more arguments ?
        }
    }
}
```

FIG.6

Node Syntax

```
class ImageTexture extends Node : bit(7) nodeType=0011100{
    bit(1) is Reused ; // This bit describes whether this node is a
    // reused node or a newly defined one. This is equivalent to USE
    if(isReused) {
        bit(10) nodeID ; // The NodeID to be re-used
    }else  {
        bit(7) nodeType ;
        bit(1) is Updatable
        if(isUpdatable){
            bit(10) nodeID ;
        }
        bit(1) endFlag ; // Are there any arguments at all ?
        while (!endFlag){ bit(2)      fieldRef ; // index to the field to be specified below
            switch(fieldRef){
            case 0 :
                    SFObjectID objectDescriptorID ;
                    break ;

case 1 :
                    SFBool repeatS ;
                    break ;

case 2 :
                    SFBool repeatT ;
            }       break ;
            bit(1) endFlag ; // Are there more arguments ?
            }
        }
    }
}
```

FIG.12

| ObjectDescriptor() | |
|---|---|
| { | |
|     NodeId | 10 |
|     streamCount | 5 |
|     extensionFlag | 1 |
|     for(j=0 ; j<streamCount ; j++) | |
|     { | |
|         ES_Descriptor() | |
|     } | |
|     if(extensionFlag==1) | |
|     { | |
|         descriptorCount | 8 |
|         for(j=0 ; j<descriptorCount; j++) | |
|         { | |
|             Descriptor() | 8 |
|         } | |
|     } | |
| } | |

Table 0-1 : ObjectDescriptor syntax

FIG.13

| ES_Descriptor() | |
|---|---|
| { | |
|     ES_Number | 5 |
|     reserved | 2 |
|     extensionFlag | 1 |
|     streamType() | 8 |
|     QoS_Descriptor() | 8 |
|     ESConfig Params() | 8 |
|     if(extensionFlag==1) | |
|     { | |
|         descriptorCount | |
|         for(j=0 ; j<descriptorCount ; j++) | |
|         { | |
|             Descriptor() | 8 |
|         } | |
|     } | |
| } | |

Table 0-2 : ES_Descriptor syntax

FIG.14

| ESConfigParams() | |
|---|---|
| { | |
| predefined | 8 |
| if(predefined==0) | |
| { | |
| bufferSizeEB | 24 |
| useTimeStamps | 1 |
| useOCR | 1 |
| timeStampResolution | 32 |
| OCRResolution | 32 |
| timeStampLength | 6 |
| OCRlength | 6 |
| if(!useTimeStamps) | |
| { | |
| accessUnitDecodingRate | 16 |
| accessUnitPresentationRate | 16 |
| startDecodingTimeStamp | timeStampLength |
| startPresentationTimeStamp | timeStampLength |
| } | |
| AU_Length | 4 |
| instantBitrateLength | 8 |
| streamPriority | 5 |
| degradationPriorityLength | 4 |
| seqNumLength | 4 |
| } | |
| } | |

Table 0-3 : ES_ConfigParams syntax

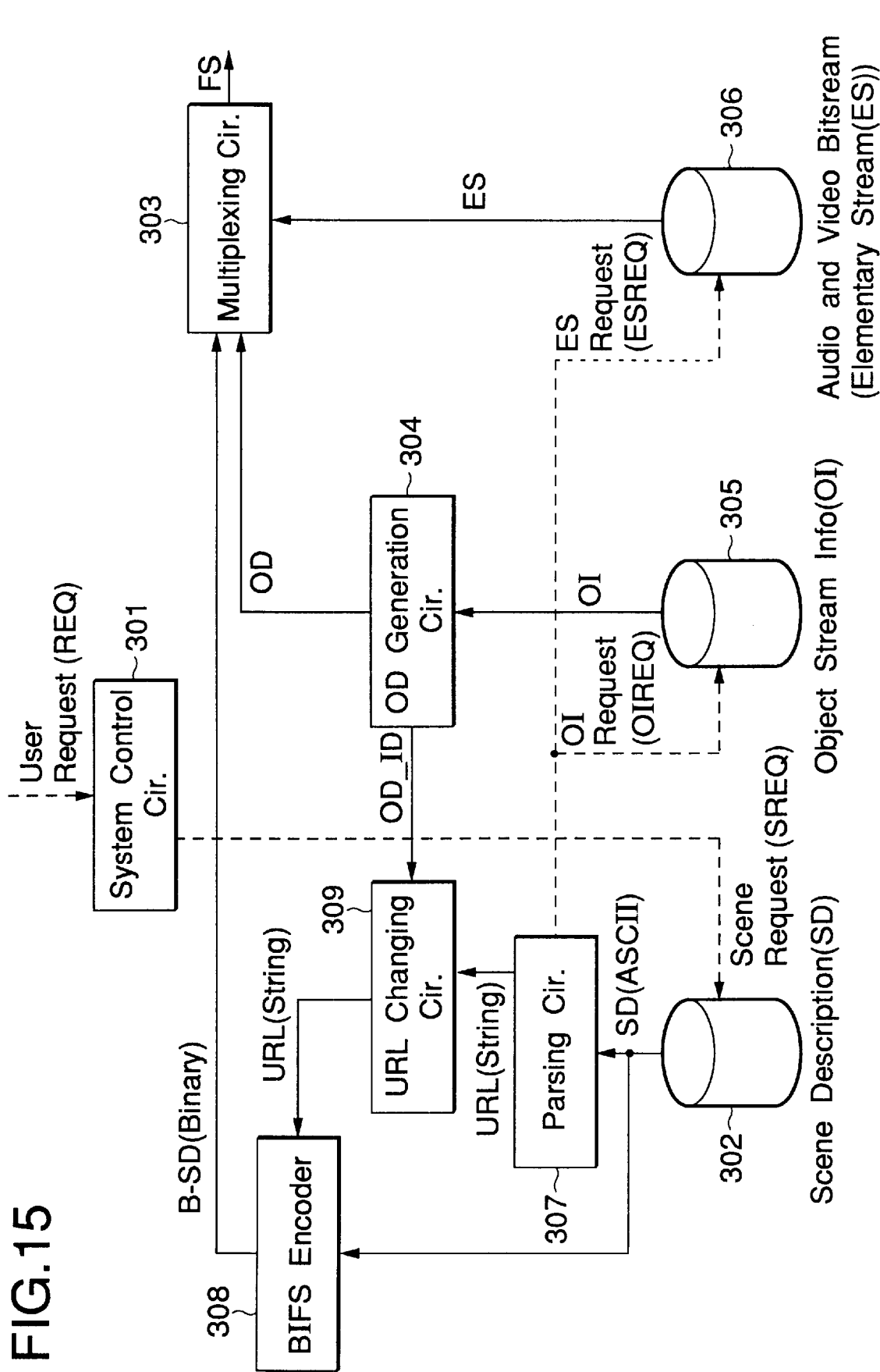

FIG.16

Node Syntax

```
class MovieTexture extends Node : bit(7) nodeType=0100011{
        bit(1) is Reused ; // This bit describes whether this node is a
        // reused node or a newly defined one. This is equivalent to USE
        if(isReused) {
                bit(10) nodeID ; // The NodeID to be re-used
        }else {
                bit(7) nodeType ;
                bit(1) is Updatable
                if(isUpdatable){
                    bit(10) nodeID ;
                }
                bit(1) endFlag ; // Are there any arguments at all ?
                while (!endFlag){ bit(3)      fieldRef ; // index to the field to be specified below
                        switch(fieldRef){
                        case 0 :
                                SFBool loop ;
                                break ;
                        case 1 :
                                SFFloat speed ;
                                break ;
                        case 2 :
                                SFTime startTime ;
                                break ;
                        case 3 :
                                SFTime stopTime ;
                                break ;

case 4 :
                                SFString URL ;
                                break ;

case 5 :
                                SFBool repeatS ;
                                break ;

case 6 :
                                SFBool repeatT ;
                             }  break ;
                        bit(1) endFlag ; // Are there more arguments ?
                }
        }
}
```

FIG.17

Image Texture
Node Syntax

```
class ImageTexture extends Node : bit(7) nodeType=0011100{
    bit(1) is Reused ; // This bit describes whether this node is a
    // reused node or a newly defined one. This is equivalent to USE
    if(isReused) {
        bit(10) nodeID ; // The NodeID to be re-used
    }else  {
        bit(7) nodeType ;
        bit(1) is Updatable
        if(isUpdatable){
            bit(10) nodeID ;
        }
        bit(1) endFlag ; // Are there any arguments at all ?
        while (!endFlag){ bit(2)    fieldRef ; // index to the field to be specified below
            switch(fieldRef){
            case 0 :
                    SFString  URL ;
                    break ;

case 1 :
                    SFBool repeatS ;
                    break ;

case 2 :
                    SFBool repeatT ;
                    break ;
            }
            bit(1) endFlag ; // Are there more arguments ?
        }
    }
}
```

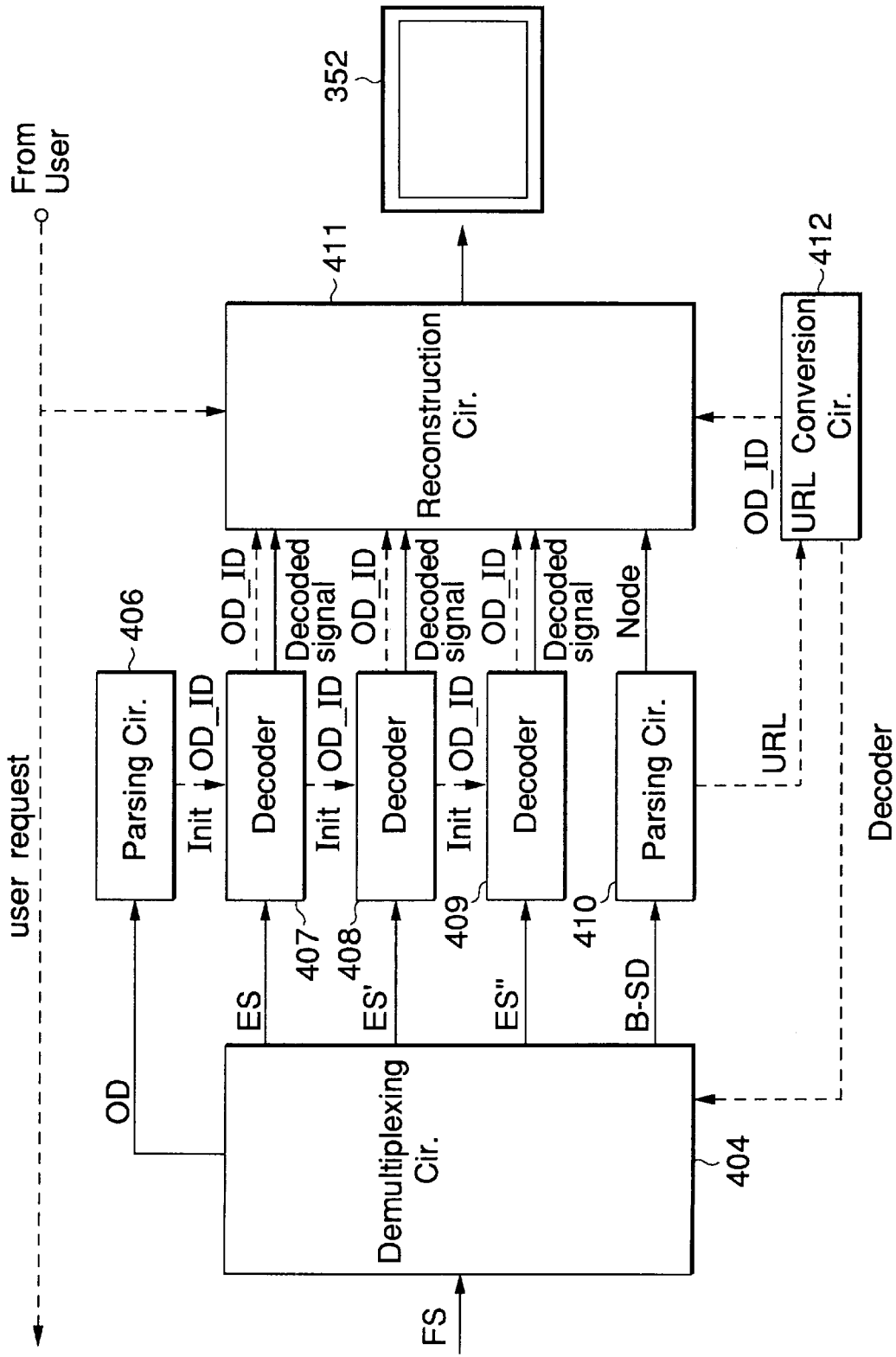

FIG. 20

Node Syntax

```
class MovieTexture extends Node : bit(7) nodeType=0100011{
    bit(1) is Reused ; // This bit describes whether this node is a
    // reused node or a newly defined one. This is equivalent to USE
    if(isReused) {
        bit(10) nodeID ; // The NodeID to be re-used
    }else {
        bit(7) nodeType ;
        bit(1) is Updatable
        if(isUpdatable){
            bit(10) nodeID ;
        }
        bit(1) endFlag ; // Are there any arguments at all ?
        while (!endFlag){ bit(3)      fieldRef ; // index to the field to be specified below
            switch(fieldRef){
            case 0 :
                    SFBool loop ;
                    break ;
            case 1 :
                    SFFloat speed ;
                    break ;
            case 2 :
                    SFTime startTime ;
                    break ;
            case 3 :
                    SFTime stopTime ;
                    break ;

case 4 :
                    bit(1) isString
                    if(isStrimg)
                            SFString URL ;
                    else
                            SFObjectID ObjectDescriptorID ;
                    break ;
            case 5 :
                    SFBool repeatS ;
                    break ;

case 6 :
                    SFBool repeatT ;
                    break ;
            }
            bit(1) endFlag ; // Are there more arguments ?
        }
    }
}
```

FIG.21

Node Syntax

```
class ImageTexture extends Node : bit(7) nodeType=0011100{
    bit(1) is Reused ; // This bit describes whether this node is a
    // reused node or a newly defined one. This is equivalent to USE
    if(isReused) {
        bit(10) nodeID ; // The NodeID to be re-used
    }else {
        bit(7) nodeType ;
        bit(1) is Updatable
        if(isUpdatable){
            bit(10) nodeID ;
        }
        bit(1) endFlag ; // Are there any arguments at all ?
        while (!endFlag){ bit(2)      fieldRef ; // index to the field to be specified below
            switch(fieldRef){
            case 0 :
                        bit(1) isString
                        if(isStrimg)
                                SFString URL ;
                        else
                                SFObjectID ObjectDescriptorID ;
                        break ;
            case 1 :
                        SFBool repeatS ;
                        break ;

case 2 :
                        SFBool repeatT ;
                        break ;
            }
            bit(1) endFlag ; // Are there more arguments ?
        }
    }
}
```

Image Signal Decoding Apparatus

GENERATION OF A BIT STREAM CONTAINING BINARY IMAGE/AUDIO DATA THAT IS MULTIPLEXED WITH A CODE DEFINING AN OBJECT IN ASCII FORMAT

BACKGROUND OF THE INVENTION

The present invention relates to coding and decoding apparatus and method for recording a moving picture signal on a recording medium such as an optical disc or a magnetic tape and reproducing it for display on a display device. The present invention may be used in video conference systems, video telephone systems, broadcast equipment, multimedia database retrieval systems, and the like in such a manner that a moving picture signal is transmitted from a transmission side to a reception side via a transmission line and received and displayed on the reception side. The present invention may also be used for editing and recording a moving picture signal.

In a video conference system or a video telephone system in which a moving picture signal is transmitted to a remote place, to efficiently utilize a transmission line, an image signal is compressed/coded by utilizing line correlation or frame correlation of the video signal. In recent years, with improvement in computer processing, moving picture information terminals using a computer have become widespread. In such systems, information is transmitted to remote locations via a transmission line such as a network. In this case, to efficiently utilize the transmission line, a signal to be transmitted such as an image, sound, or computer data is transmitted after being compressed/coded. On a terminal side (reception side), the compressed/coded signal that has been transmitted is decoded by a predetermined decoding method corresponding to the encoding method into an original image, sound, or computer data, which is output by a display device, speakers, or the like of the terminal. Previously, the transmitted image signal or the like was merely output, as it is, on a display device. But in information terminals using a computer, a plurality of images, sounds, or computer data can be handled or displayed in a two-dimensional or three-dimensional space after being subjected to a given conversion process. This type of process can be realized in such a manner that information of a two-dimensional or three-dimensional space is described by a given method on a transmission side, and the terminal side (reception side) executes a conversion process on an image signal or the like according to the description.

A typical example for describing spatial information is VRML (Virtual Reality Modeling Language), which has been standardized by ISO-IEC/JTC1/SC24. The latest version VRML 2.0 is described in IS14772. VRML is a language for describing a three-dimensional space and defines data for describing attributes, shapes, etc. of a three-dimensional space. Such data is called a node. To describe a three-dimensional space, it is necessary to describe in advance how to combine the nodes. Each node includes data indicating color, texture, etc., data indicating polygon shapes, and other information.

In information terminals using a computer, a given object is generated by CG (computer graphics) according to a description of the above-mentioned VRML using polygons etc. With VRML, it is possible to attach a texture to a three-dimensional object that has been generated in this manner and that has been composed of polygons. A node called "Texture" is defined for still pictures and a node called "MovieTexture" is defined for moving pictures. Information (a file name, display start time or end time, etc.) on the texture to be attached is described in these nodes. Referring to FIG. 23, a texture attachment process (hereinafter referred to as a texture mapping process, where appropriate) will be described.

FIG. 23 shows an example of the configuration of texture mapping apparatus. As shown in FIG. 23, a memory group 200 includes a texture memory 200a, a gray scale memory 200b, and a three-dimensional object memory 200c. The texture memory 200a stores texture information that is input externally. The gray scale memory 200b and the three-dimensional object memory 200c store key data indicating the degree of penetration/transparency of the texture and three-dimensional object information that are also input externally. The three-dimensional object information is necessary for generation of polygons and is related to illumination. A rendering circuit 201 generates a three-dimensional object by generating polygons based on the three-dimensional object information that is stored in the three-dimensional object memory 200c of the memory group 200. Further, based on the three-dimensional object data, the rendering circuit 201 reads out the texture information and the key data indicating the degree of penetration/transparency of the texture from the memories 200a and 200b, respectively, and executes a superimposition process on the texture and a corresponding background image by referring-to the key data. The key data indicates the degree of penetration of the texture at a corresponding position, that is, the transparency of an object at the corresponding position.

A two-dimensional conversion circuit 202 outputs a two-dimensional image signal that is obtained by mapping the three-dimensional object that has been generated by the rendering circuit 201 to a two-dimensional plane based on view point information that is supplied externally. Where the texture is a moving picture, the above process is executed on a frame-by-frame basis.

With VRML, it is possible to handle, as texture information, data that has been compressed according to JPEG (Joint Photographic Experts Group) which is typically used in high-efficiency coding of a still picture, MPEG (Moving Picture Experts Group) for high-efficiency coding of a moving picture, or the like. Where an image so compressed is used as texture, the texture (image) is decoded by a decoding process corresponding to an encoding scheme. The decoded image is stored in the texture memory 200a of the memory group 200 and subjected to a process similar to the above process.

The rendering circuit 201 attaches the texture information that is stored in the texture memory 200a to an object at a given position regardless of the format of an image and whether the image is a moving picture or a still picture. Therefore, the texture that can be attached to a certain polygon is stored in one memory. In transmitting three-dimensional object information, it is necessary to transmit three-dimensional coordinates of each vertex. Real number data of 32 bits is needed for each coordinate component. Real number data of 32 bits or more is also needed for such attributes as reflection of each three-dimensional object. Therefore, information to be transmitted is enormous and further increases in transmitting a complex three-dimensional object or a moving picture. Therefore, in transmitting three-dimensional information as above or texture information via a transmission line, it is necessary to transmit compressed information for improving the transmission efficiency.

A typical example of high-efficiency coding (compression) schemes for a moving picture is the MPEG (Moving Picture Experts Group; moving picture coding for storage) scheme, which is discussed in ISO-IEC/JTC1/SC2/WG11 and was proposed as a standard. MPEG employs a hybrid scheme that is a combination of motion-compensation predictive coding and DCT (discrete cosine transform) coding. To accommodate various applications and functions, MPEG defines several profiles (classification of functions) and levels (quantities such as an image size). The most basic item is a main level of a main profile (MP@ML).

An example of configuration of an encoder (image signal coding apparatus) of MP@ML of the MPEG scheme will be described with reference to FIG. 24. An input image signal is first input to a frame memory 1, and then coded in a predetermined order. The image data to be coded is input to a motion vector detection circuit (ME) 2 on a macroblock basis. The motion vector detection circuit 2 processes image data of each frame as an I-picture, a P-picture, or a B-picture in accordance with a predetermined sequence. That is, it is predetermined whether images of respective frames that are input sequentially are processed as I, P, and B-pictures (for instance, they are processed in the order of I, B, P, B, P, . . . , B, P).

The motion-vector detection circuit 2 performs motion compensation by referring to a predetermined reference frame and detects its motion vector. The motion compensation (interframe prediction) has three prediction modes, that is, forward prediction, backward prediction, and bidirectional prediction. Only forward prediction is available as a P-picture prediction mode, and three prediction modes, that is, forward prediction, backward prediction, and bidirectional prediction are available as a B-picture prediction mode. The motion vector detection circuit 2 selects a prediction mode that minimizes the prediction error and generates a corresponding prediction vector.

The resulting prediction error is compared with, for instance, the variance of a macroblock to be coded. If the variance of the macroblock is smaller than the prediction error, no prediction is performed on the macroblock and intraframe coding is performed. In this case, the prediction mode is intra-image prediction (intra). A motion vector detected by the motion vector detection circuit 2 and the above-mentioned prediction mode are input to a variable-length coding circuit 6 and a motion compensation circuit (MC) 12. The motion compensation circuit 12 generates prediction image data based on a given motion vector and inputs it to operation circuits 3 and 10. The operation circuit 3 calculates difference data indicating a difference between the value of the macroblock to be coded and the value of the prediction image data and outputs a calculation result to a DCT circuit 4. In the case of an intra-macroblock mode, the operation circuit 3 outputs, as it is, the macroblock data to be coded to the DCT circuit 4.

The DCT circuit 4 converts the input data into DCT coefficients by subjecting the data to DCT (discrete cosine transform). The DCT coefficients are input to a quantization circuit (Q) 5, where they are quantized with a quantization step corresponding to a data storage amount (buffer storage amount) of a transmission buffer 7. Quantized coefficients (data) are input to the variable-length coding circuit 6.

The variable-length coding circuit 6 converts quantized data that is supplied from the quantization circuit 5 into a variable-length code such as a Huffman code. The variable-length coding circuit 6 also receives the quantization step (scale) from the quantization circuit 5 and the prediction mode (indicating which of intra-image prediction, forward prediction, backward prediction, and bidirectional prediction was set) and the motion vector from the motion vector detection circuit 2, and performs variable length coding thereon. The transmission buffer 7 temporarily stores received coded data and outputs a quantization control signal that corresponds to the storage amount to the quantization circuit 5. When the residual data amount has increased to the allowable upper limit, the transmission buffer 7 controls to reduce the data amount of quantization data by increasing the quantization scale of the quantization circuit 5 using the quantization control signal. Conversely, when the residual data amount has decreased to the allowable lower limit, the transmission buffer 7 controls to increase the data amount of quantization data by decreasing the quantization scale of the quantization circuit 5 using the quantization control signal. Overflow or underflow of the transmission circuit 7 is prevented in this manner. Coded data stored in the transmission buffer 7 is read out with predetermined timing and output as a bit stream to a transmission line. On the other hand, quantized data that is output from the quantization circuit 5 is input to a de-quantization circuit (IQ) 8, where it is de-quantized in accordance with a quantization step supplied from the quantization circuit 5. Output data (DCT coefficients) from the de-quantization circuit 8 is input to an IDCT (inverse DCT) circuit 9, then subjected to inverse DCT processing, and stored in a frame memory (FM) 11 via the operation circuit 10.

Next, an example of a decoder (image signal decoding apparatus) of MP@ML of MPEG will be described with reference to FIG. 25. Coded image data (bit stream) that has been transmitted via a transmission line is received by a receiving circuit (not shown), or reproduced by a reproduction circuit, temporarily stored in a reception buffer 21, and then supplied to a variable-length decoding circuit (IVLC) 22. Performing variable-length decoding on the data supplied from the reception buffer 21, the variable-length decoding circuit 22 outputs a motion vector and a prediction mode to a motion compensation circuit 27 and a quantization step to a de-quantization circuit 23. Further, the variable-length decoding circuit 22 outputs decoded quantized data to the de-quantization circuit 23. The de-quantization circuit 23 de-quantizes the quantized data that is supplied from the variable-length decoding circuit 22 in accordance with the quantization step also supplied from the variable-length decoding circuit 22, and outputs the resulting data (DCT coefficients) to an IDCT circuit 24. The data (DCT coefficients) that is output from the de-quantization circuit 23 is subjected to inverse DCT in the IDCT circuit 24 and supplied to an operation circuit 25 as output data. If the output data supplied from the IDCT circuit 24 (the input bit stream) is I-picture data, it is output from the operation circuit 25 as image data and then supplied to a frame memory 26 and stored there for generation of prediction image data for image data (P or B-picture data) that will be input to the operation circuit 25. This image data is also output, as it is, to the external system as a reproduction image.

If the output data supplied from the IDCT circuit 24 (the input bit stream) is a P or B-picture, the motion compensation circuit 27 generates a prediction image based on the image data stored in the frame memory 26 in accordance with the motion vector and the prediction mode that are supplied from the variable-length decoding circuit 22, and outputs it to the operation circuit 25. The operation circuit 25 adds the output data that is supplied from the IDCT circuit 24 and the prediction image data that is supplied from the motion compensation circuit 27, to produce output image data. In the case of a P-picture, the output data of the operation circuit 25 is input to the frame memory 26 and stored there as prediction image data (a reference image) for an image signal to be subsequently decoded.

In MPEG, various profiles and levels other than MP@ML are defined and various tools are prepared. Scalability is one of those tools. In MPEG, the scalable coding scheme is introduced that realizes scalability for accommodating different image sizes and frame rates. For example, in the case of spatial scalability, an image signal having a small image size can be decoded by decoding only lower-layer bit streams, and an image signal having a large image size can be decoded by decoding lower-layer and upper-layer bit streams. An encoder of spatial scalability will be described with reference to FIG. 26. In the case of the spatial scalability, the lower layer corresponds to image signals having a small image size and the upper layer corresponds to image signals having a large size. A lower-layer image signal is first input to the frame memory 1 and then coded in the same manner as in the case of MP@ML. However, not only is the output of the operation circuit 10 supplied to the frame memory 11 used as a lower-layer prediction image data, but also it is used as an upper-layer prediction image data after being enlarged to the same image size as the upper-layer image size by an image enlargement circuit (up sampling) 31. According to FIG. 26, an upper-layer image signal is input to a frame memory 51. A motion vector detection circuit 52 determines a motion vector and a prediction mode in the same manner as in the case of MP@ML. A motion compensation circuit 62 generates prediction image data in accordance with the motion vector and the prediction mode that have been determined by the motion vector detection circuit 52 and outputs it to a weighting circuit (W) 34. The weighting circuit 34 multiplies the prediction image data by a weight W and outputs the weighted prediction image data to an operation circuit 33.

As described above, output data (image data) of the operation circuit 10 is input to the image enlargement circuit 31. The image enlargement circuit 31 enlarges the image data that has been generated by the operation circuit 10 to make its size equal to the upper-layer image size and outputs the enlarged image data to a weighting circuit (1−W) 32. The weighting circuit 32 multiplies the enlarged image data of the image enlargement circuit 31 by a weight (1−W) and outputs the result to the operation circuit 33. The operation circuit 33 adds the output data of the weighting circuits 32 and 34 and outputs the result to an operation circuit 53 as a prediction image data. The output data of the operation circuit 33 is also input to an operation circuit 60, added to output data of an inverse DCT circuit 59 there, and then input to a frame memory 61 for later use as a prediction image data for image data to be coded. The operation circuit 53 calculates a difference between the output data of the image data to be coded and the output data of the operation circuit 33, and outputs the result as difference data. However, in the case of intraframe coding macroblock, the operation circuit 53 outputs, as it is, the image data to be coded to a DCT circuit 54. The DCT circuit 54 performs DCT (discrete cosine transform) on the output of the operation circuit 53, to generate DCT coefficients, which are output to a quantization circuit 55. As in the case of MP@ML, the quantization circuit 55 quantizes the DCT coefficients in accordance with a quantization scale that is based on the data storage amount of a transmission buffer 57 and other factors, and outputs a result (quantized data) to a variable-length coding circuit 56. The variable-length coding circuit 56 performs variable-length coding on the quantized data (quantized DCT coefficients) and outputs a result as an upper-layer bit stream via the transmission buffer 57. The output data of the quantization circuit 55 is de-quantized by a de-quantization circuit 58 with the quantization scale that was used in the quantization circuit 55, subjected to inverse DCT in the inverse DCT circuit 59, and then input to the operation circuit 60. The operation circuit 60 adds the outputs of the operation circuit 33 and the inverse DCT circuit 59 and inputs a result to the frame memory 61. The variable-length coding circuit 56 also receives the motion vector and the prediction mode that were detected by the motion vector detection circuit 52, the quantization scale that was used in the quantization circuit 55, and the weights W that were used in the weighting circuits 32 and 34, which are coded in the variable-length coding circuit 56 and then transmitted.

Next, an example of a decoder of the spatial scalability will be described with reference to FIG. 27. A lower-layer bit stream is input to the reception buffer 21 and then decoded in the same manner as in the case of MP@ML. However, not only is the output of the operation circuit 25 output to the external system and stored in the frame memory 26 for use as a prediction image data for an image signal to be decoded later, but also it is used as an upper-layer prediction image data after being enlarged to the same image size as an upper-layer image size by an image signal enlargement circuit 81. An upper-layer bit stream is supplied to a variable-length decoding circuit 72 via a reception buffer 71, and a variable-length code is decoded there. That is, a quantization scale, a motion vector, a prediction mode, and a weighting coefficient (weight W) are decoded together with DCT coefficients. The DCT coefficients (quantized data) decoded by the variable-length decoding circuit 72 are de-quantized by a de-quantization circuit 73 by using the decoded quantization scale, subjected to inverse DCT in an inverse DCT circuit 74, and then supplied to an operation circuit 75.

A motion compensation circuit 77 generates prediction image data in accordance with the decoded motion vector and prediction mode and inputs it to a weighting circuit 84. The weighting circuit 84 multiplies the output of the motion compensation circuit 77 by the decoded weight W and outputs a result to an operation circuit 83. Not only is the output of the operation circuit 25 supplied as lower-layer reproduction image data and output to the frame memory 26, but also it is output to a weighting circuit 82 after being enlarged by the image signal enlargement circuit 81 so as to have the same image size as the upper-layer image size. The weighting circuit 82 multiplies the output of the image signal enlargement circuit 81 by (1−W) by using the decoded weight W, and outputs the result to the operation circuit 83. The operation circuit 83 adds the outputs of the weighting circuits 82 and 84 and outputs the result to the operation circuit 75. The operation circuit 75 adds the output of the inverse DCT circuit 74 and the output of the operation circuit 83, and outputs the result as upper-layer reproduction image data and also supplies it to the frame memory 76 for use as prediction image data for image data to be decoded later.

The above description is applied to a process for a luminance signal. A color difference signal is processed in a similar manner. The motion vector to be used in processing a color difference signal is obtained by halving a motion vector for a luminance signal in both vertical and horizontal directions.

While the MPEG scheme has been described above, other various high-efficiency coding schemes for a moving picture also have been standardized. For example, ITU-T (International Telecommunications Union) has standardized the schemes H.261 and H.263 as coding for communication. Basically, like the MPEG scheme, H.261 and H.263 are a combination of motion-compensation predictive coding and DCT coding. A coding apparatus and a decoding apparatus according to H.261 or H.263 are configured in the same manner as in the MPEG scheme though the details of header information etc. are different. Further, in the above-described MPEG scheme, the standardization of a new highly efficient coding scheme called MPEG4 is now underway. Major features of MPEG4 are that an image is coded on an object-by-object basis (an image is coded in units of a plurality of images) and that the image can be modified on the object-by-object basis. That is, on the decoding side, images of respective objects or a plurality of images can be combined to reconstruct one image.

In ISO-IEC/JTC1/SC29/WG11, as previously mentioned, the standardization work for MPEG4 is now underway. In this work, a scheme of handling a natural image and a computer graphics image within a common framework is being studied. In this scheme, a three-dimensional object is described by using VRML, and a moving picture and sound or audio are compressed according to the MPEG standard. A scene consisting of a plurality of three-dimensional objects, moving pictures, etc. is described according to VRML. The description of a scene (hereinafter abbreviated as a scene description), the description of a three-dimensional object, and AV data consisting of a moving image, sound or audio compressed according to the MPEG scheme, which have been obtained in the above manner, are given time stamps and multiplexed by a multiplexing circuit into a bit stream, which is transmitted as multiplexed bit stream. In a reception terminal that has received a multiplexed bit stream, a demultiplexing circuit extracts the scene description, the description of a three-dimensional object, and AV stream (a stream corresponding to AV data), decoders decode respective bit streams, and a scene that is reconstructed by a scene construction circuit is displayed on a display device.

In the above method, it is necessary to clarify a relationship between nodes that are described according to VRML (description of three-dimensional objects and scene description) and AV data of moving pictures, sounds, audio, etc. For example, it is necessary to indicate what AV stream should be texture-mapped with a certain three-dimensional object. In VRML, texture to be attached to (mapped with) a three-dimensional object is designated by a URL (Uniform Resource Locator which is a character string indicating a server on a network). This designation method corresponds to designation of the absolute address of an AV data file on the network. On the other hand, in a system according to the MPEG scheme, each AV stream is identified by designating its ID. This corresponds to designation of a relative path of a stream in a session (a communication line) when the session has been established. That is, in VRML, there is no method for identifying a stream other than using a URL. But an application of, for instance, an MPEG real time communication requires ID-based designation. There is a problem of incompatibility between the two schemes.

When viewed from another point, it can be said that VRML assumes a model in which a client requests information. On the other hand, MPEG assumes a model in which broadcast information or the like is transmitted under the control of a server. The difference in these models causes a problem that it is difficult to fuse together a computer graphics image and a natural image while compatibility with VRML2.0 is maintained.

SUMMARY OF THE INVENTION

The present invention has been made in view of the foregoing, and an object of the invention is therefore to enable a computer graphics image that is described according to VRML and an image or the like that is compressed according to the MPEG scheme to be transmitted in such a state that they are multiplexed into the same bit (data) stream.

In a method for producing three dimensional space modeling data defined by a plurality of nodes and image/audio data specified by a position included in the nodes, the following steps are carried out: extracting a respective position from a node of the three dimensional space modeling data; converting the extracted position into a stream ID corresponding to image/audio data associated with the position; replacing the position with the stream ID; and multiplexing the image/audio data and three dimensional space modeling data including the stream ID to produce a bit stream.

According to one aspect of the present invention, the three dimensional space modeling data is described by Virtual Reality Modeling Language (VRML), the position is represented by Uniform Resource Locator (URL) expressed in ASCII format, and the stream ID is expressed in binary format.

According to another aspect of the present invention, the stream ID is converted into a character string, and it is determined whether to replace the position of the image/audio data with the stream ID or the character string depending on whether the image/audio data is supplied by one server or multiple servers.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 3 shows an example of an ASCII format of a scene description for attachment of a moving picture as a texture to a node;

FIG. 4 shows an example of an ASCII format of a scene description for attachment of a still picture as a texture to a node;

FIG. 5 shows an example of a binary format of a scene description for attaching a moving picture as a texture to a node;

FIG. 6 shows an example of a binary format of a scene description for attaching a still picture as a texture to a node;

FIG. 12 shows an example of an object descriptor OD;

FIG. 13 shows an example of "ES_Descriptor";

FIG. 14 shows an example of "ES_ConfigParams";

FIG. 15 is a block diagram showing an example of the configuration of a second embodiment of coding apparatus according to the invention;

FIG. 16 shows an example of a binary format of a scene description for attachment of a moving picture as a texture to a node;

FIG. 17 shows an example of a binary format of a scene description for attachment of a still picture as a texture to a node;

FIG. 18 is a block diagram showing an example of the configuration of a second embodiment of decoding apparatus according to the invention;

FIG. 20 shows an example of a binary format of a scene description SD for attachment of a moving picture as a texture;

FIG. 21 shows an example of a binary format of a scene description SD for attachment of a still picture as a texture;

DETAILED DESCRIPTION OF THE PREFERRED EMBODIMENTS

The preferred embodiments of the present invention will be explained in detail with reference to the accompanying drawings.

Figure 1:
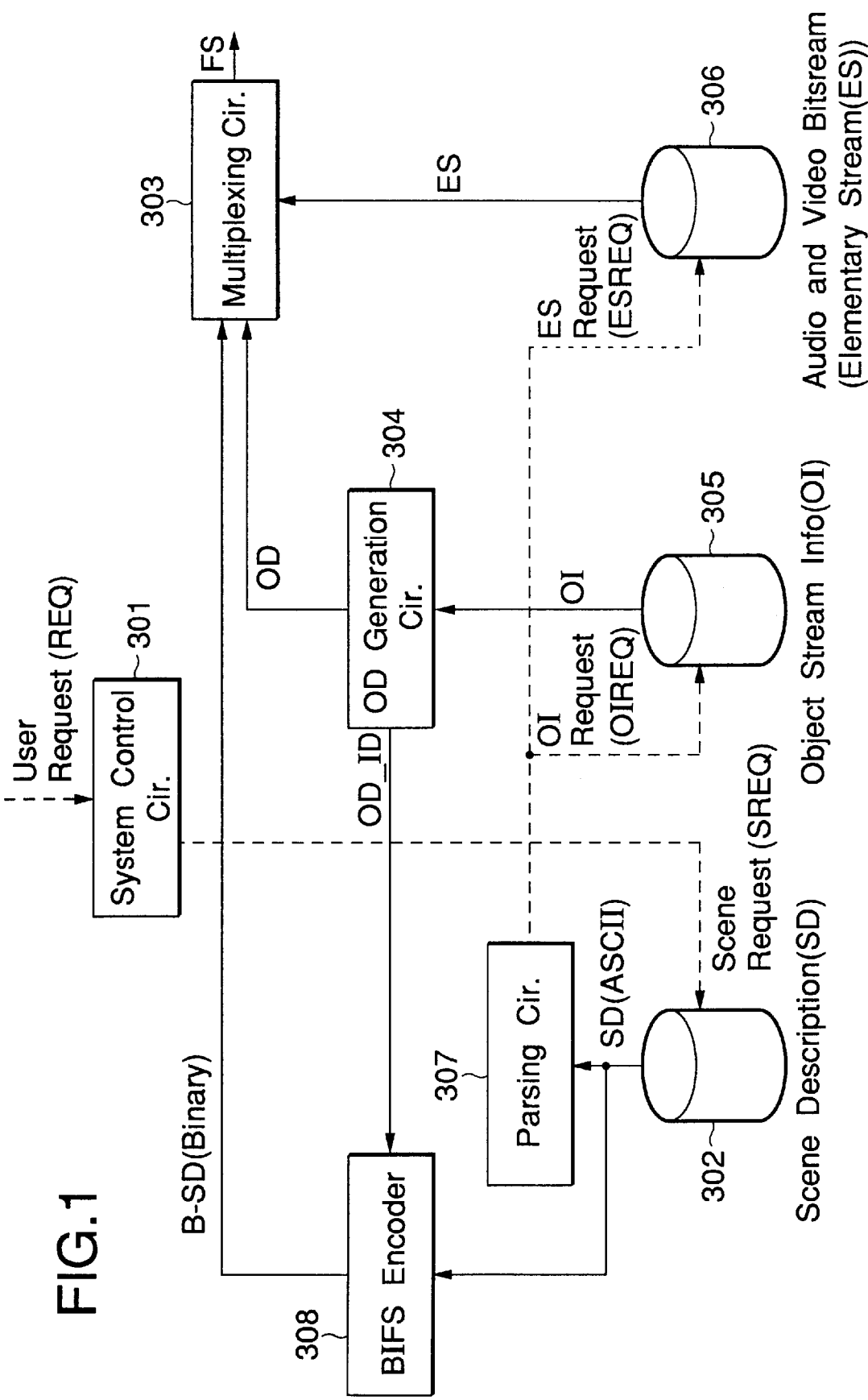
FIG. 1 is a block diagram showing an example of configuration of a first embodiment of coding apparatus according to the present invention.

FIG. 1 is a block diagram of a first embodiment of coding apparatus according to the present invention.

Referring to FIG. 1, a system control circuit 301 receives a request signal (Request (REQ)), determines, by referring to a scene description SD (the details will be described later) what is stored in a storage device 302, what AV object (three-dimensional object, natural image, sound, or the like) should be transmitted, and outputs a scene request signal (Scene Request (SREQ)) to the storage device 302. The storage device 302 stores the scene description SD that describes a two-dimensional or three-dimensional scene. The scene description SD is described according to an ASCII format that complies with VRML2.0. A storage device 306 stores Audio and Video (AV) data bit stream (elementary streams (ES)) such as a moving picture, still picture, and sound. A storage device 305 stores information (object stream info (OI)) necessary for decoding AV objects stored in the storage device 306. For example, the object stream information OI is a buffer size necessary for decoding an AV object, or a time stamp of each access unit. The object stream information OI includes all information of AV bit stream corresponding to the respective AV objects.

Figure 2:
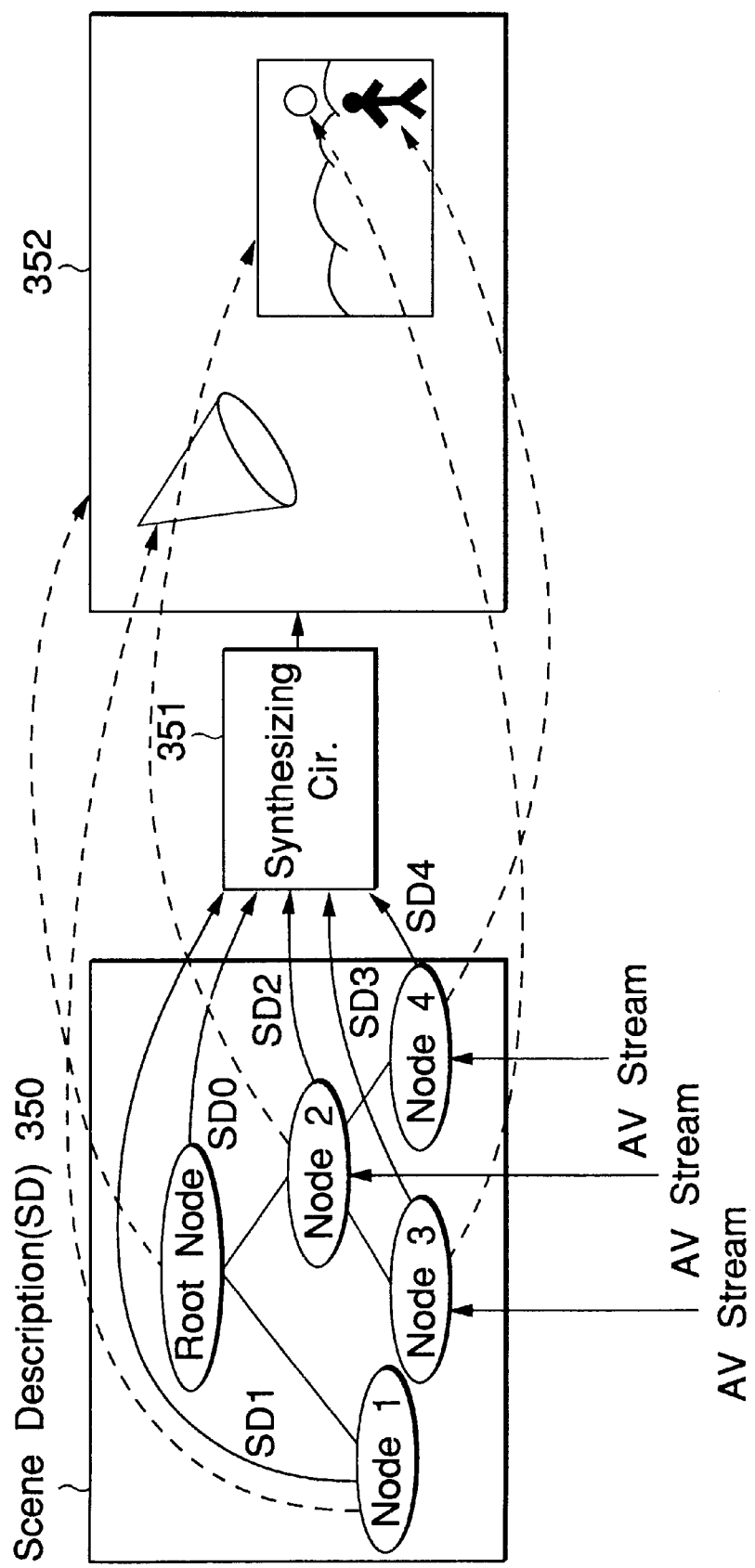
FIG. 2 shows a relationship between a scene description SD and nodes.

A relationship among a scene description, AV data (streams), and three-dimensional objects will be described below with reference to FIG. 2. In the example of FIG. 2, a rectangular image sequence and a triangular pyramid generated by computer graphics are displayed on the screen 352. Although in this example no texture is attached to the triangular pyramid, a texture may be attached to it as in the case of other three-dimensional objects. A texture to be added may be either a still picture or a moving picture.

The scene description SD 350 comprises descriptions called nodes. There is a parent (root) node SD0 that describes how to arrange the objects in the entire image. A node SD1, which is a child node of the parent node SD0, describes information relating to the triangular pyramid. A node SD2, which is also a child node of the parent node SD0, describes information relating to the rectangular plane to which images are to be attached.

In FIG. 2, the image signal comprises three video objects VO (background, sun, and person). The Node SD2 describes information relating to the background. The node SD3 describes information relating to the rectangular plane for attachment of the sun. The node SD4 describes information relating to the plane for attachment of the person. Each node describes a URL that indicates an address of the corresponding AV data (bit stream) file. The nodes SD3 and SD4 are child nodes of the node SD2.

The single scene description SD is a collection of all the nodes SD0–SD4. In the following, a collection of descriptions of all nodes is called a scene description and the respective nodes are called objects (two-dimensional or three-dimensional objects). Therefore, each node corresponds to a single two-dimensional or three-dimensional object. Each object corresponds, one to one, to an object descriptor OD that describes AV data (bit stream) relating to the object.

Referring to FIG. 1, a parsing circuit 307 reads out a URL (indicating the address of an AV data file) described in a node that is output from the storage device 302, and outputs, to the storage device 306, a request signal (ES Request (ESREQ)) for requesting output of AV data (bit stream) corresponding to the URL. Further, the parsing circuit 307 outputs, to the storage device 305, a request signal (OI Request (OIREQ)) for requesting output of object stream information OI that describes information relating to the AV data (bit stream) corresponding to the URL.

An OD (object descriptor) generation circuit 304 receives object stream information OI relating to an AV object that is output from the storage device 305, and extracts, as an object descriptor OD, only information of AV data (bit stream) that was requested by a request signal OIREQ and outputs it to a multiplexing circuit 303. Further, the OD generation circuit 304 generates an ID number OD_ID for each extracted object descriptor OD, records it in the object descriptor OD and outputs the resulting object descriptor OD to the multiplexing circuit 303, and also outputs the generated ID number ID_OD to a BIFS encoder 308.

The BIFS encoder 308 converts the scene description of an ASCII format that is output from the storage device 302 into a binary format, and replaces a URL included in the scene description SD with ID number OD_ID that is output from the OD generation circuit 304. And then, the BIFS encoder 308 outputs the scene description B-SD that has been converted into a binary format and replaced with the ID number OD_ID to the multiplexing circuit 303.

The multiplexing circuit 303 multiplexes, in prescribed order, AV data (bit stream) stored in the storage device 306, the scene description B-SD that has been converted into a binary format by the BIFS encoder 308, and the object descriptors OD that have been generated by the OD generation circuit 304, and outputs the multiplexed result as a multiplexing bit stream FS. A detailed example of the multiplexing circuit 303 will be described later with reference to FIG. 7.

Next, the operation of the above embodiment will be described. When a user inputs, from an external terminal (not shown), a request signal for causing a certain AV object to be displayed, a request signal REQ is supplied to the scene control circuit 301. Upon reception of the request signal REQ, the scene control circuit 301 determines what AV object should be transmitted by referring to the scene description SD that is stored in the storage device 302 based on the request signal REQ, and outputs a scene request signal SREQ to the storage device 302. Upon reception of the scene request signal SREQ, the storage device 302 reads out the corresponding scene description SD (described in an ASCII format) and supplies it to the parsing circuit 307 and the BIFS encoder 308.

FIG. 3 shows an example of a scene description SD (described in the ASCII format) for attachment of a moving picture as a texture. In this example, a URL indicating the address of a moving picture file to be attached is described on the sixth line. FIG. 4 shows an example of a scene description SD (described in the ASCII format) for attachment of a still picture as a texture. In this example, a URL indicating the address of a still picture file to be attached is described on the second line. The formats of FIGS. 3 and 4 comply with the node description of VRML.

The parsing circuit 307 reads out a URL (indicating the address of AV data (bit stream) file) included in a node that constitutes the supplied scene description SD, and outputs a request signal ESREQ to the storage device 306. As a result, the corresponding AV data (bit stream) ES is output from the storage device 306 and supplied to the multiplexing circuit 303.

Further, the parsing circuit 307 outputs, to the storage device 305, a request signal OIREQ for requesting output of object stream information OI relating to the AV data (bit stream) ES indicated by the URL that is included in the node. As a result, the object stream information OI corresponding to the URL is output from the storage device 305 to the OD generation circuit 304.

The OD generation circuit 304 extracts, as an object descriptor OD, only the information requested by the request signal OIREQ from the object stream information OI relating to the AV object that is supplied from the storage device 305. Further, the OD generation circuit 304 generates an ID number OD_ID, records it in the object descriptor OD, and outputs the resulting object descriptor OD to the multiplexing circuit 303. Still further, the OD generation circuit 304 outputs the ID number OD_ID that has been generated for each object descriptor OD to the BIFS encoder 308.

The BIFS encoder 308 converts the scene description SD of an ASCII format that is supplied from the storage circuit 302 into data (a scene description B-SD) of a binary format by a predetermined method and replaces URL included in the scene description SD. And then, the BIFS encoder 308 outputs to the multiplexing circuit 303 the scene description B-SD that has been converted to the binary format. The details of the binary format are described in the document called MPEG4WD (document number N1825) that has been standardized by ISO. An example of the binary format will be described below.

FIG. 5 shows data obtained by converting a scene description (ASCII format; see FIG. 3) for attaching a moving picture as a texture into a binary format. In FIG. 5, "ObjectDescriptorID" appearing on the 29th line is a flag indicating ID number OD_ID of a moving picture to be attached to this node. The BIFS encoder 308 writes ID number OD_ID that is supplied from the OD generation circuit 304 in this portion in the scene description B-SD that has been converted into the binary format. As a result, the address of AV data (bit stream) that was described as a URL in an ASCII format is converted into ID number OD_ID (binary format).

FIG. 6 shows data that is obtained by converting a scene description (ASCII format; see FIG. 4) for attaching a still picture as a texture into a binary format. In this example, "ObjectDescriptorID" appears on the 17th line and ID number OD_ID is written in this portion in the scene description B-SD that has been converted into the binary format. The scene description B-SD of a binary format thus generated is supplied to the multiplexing circuit 303. The multiplexing circuit 303 multiplexes, in prescribed order, AV data (bit stream) stored in the storage device 306, the scene description B-SD that has been converted into a binary format by the BIFS encoder 308, and the object descriptors OD that have been generated by the OD generation circuit 304, and outputs the multiplexing bit stream FS.

Figure 7:
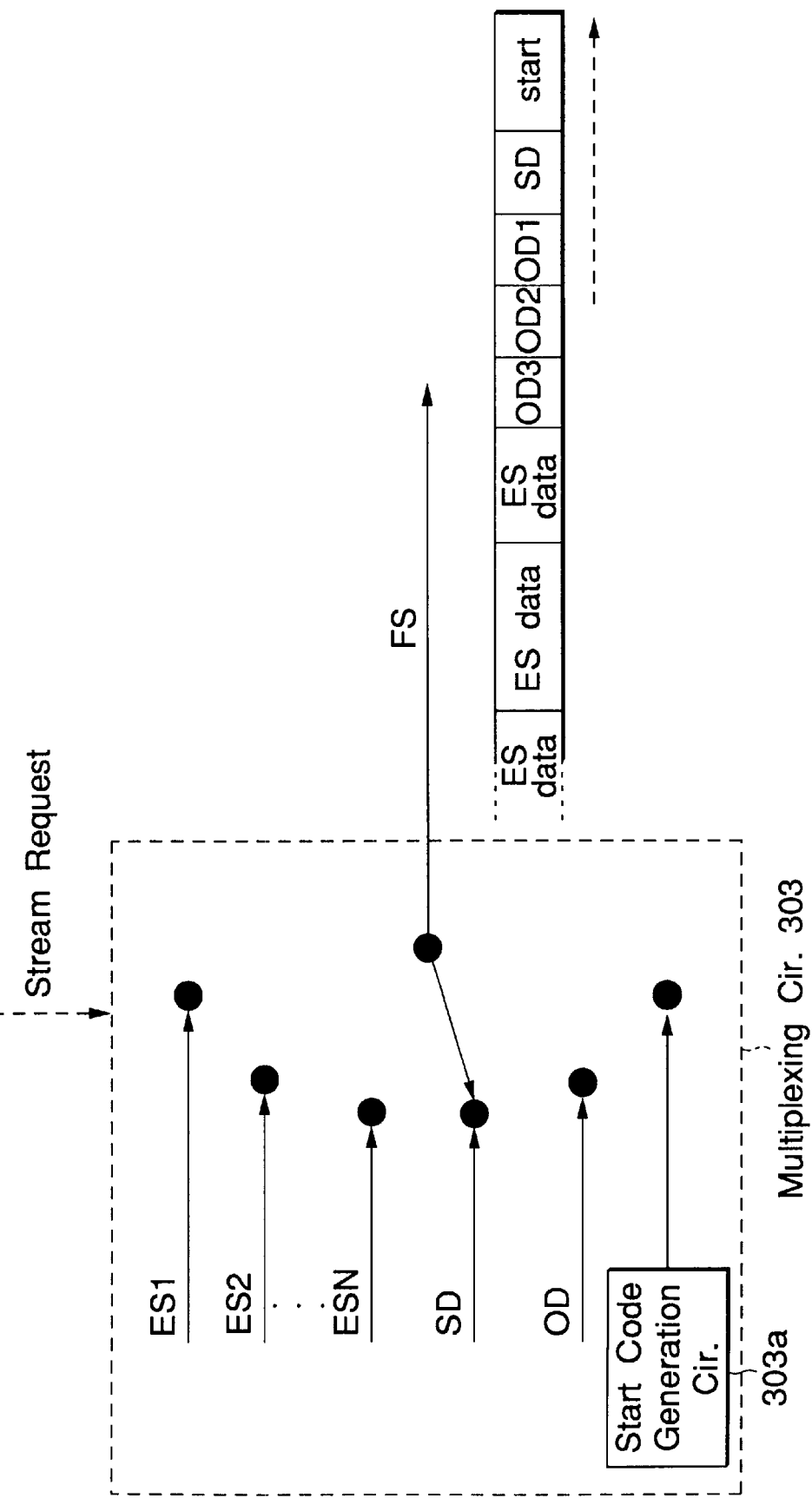
FIG. 7 shows an example of the detailed configuration of a multiplexing device shown in FIG. 1.

FIG. 7 shows an example of a detailed configuration of the multiplexing circuit 303. In FIG. 7 a start code generation circuit 303a generates and outputs a start code that indicates a start position of a bit stream.

AV data (bit stream) ES1–ESN that are output from the storage device 306 are supplied to corresponding terminals. A scene description B-SD in a binary format that is output from the BIFS encoder 308 and object descriptors OD that are output from the OD generation circuit 304 are supplied to corresponding terminals. Further, the start code that is output from the start code generation circuit 303a is supplied to a corresponding terminal.

The multiplexing circuit 303 operates a switch so as to make a connection to the terminal to which the start code generation circuit 303a is connected, to thereby output the start code. Next, switching is made to the terminal to which the scene description SD is input, whereby the scene description SD is output. Then, switching is made to the terminal to which the object descriptors OD are input, whereby the object descriptors OD are output. Finally, switching is made sequentially, in accordance with the data, to the terminals to which the AV data (bit stream) are input, whereby the AV data (bit stream) ES1–ESN are output.

The multiplexing circuit 303 selects the start code, the scene description SD, the object descriptors OD, and the AV data (bit stream) with the switch, and thereby outputs those to the external system as a multiplexed bit stream FS. The multiplexed bit stream FS is supplied to a reception terminal via a transmission line, for example.

Figure 8:
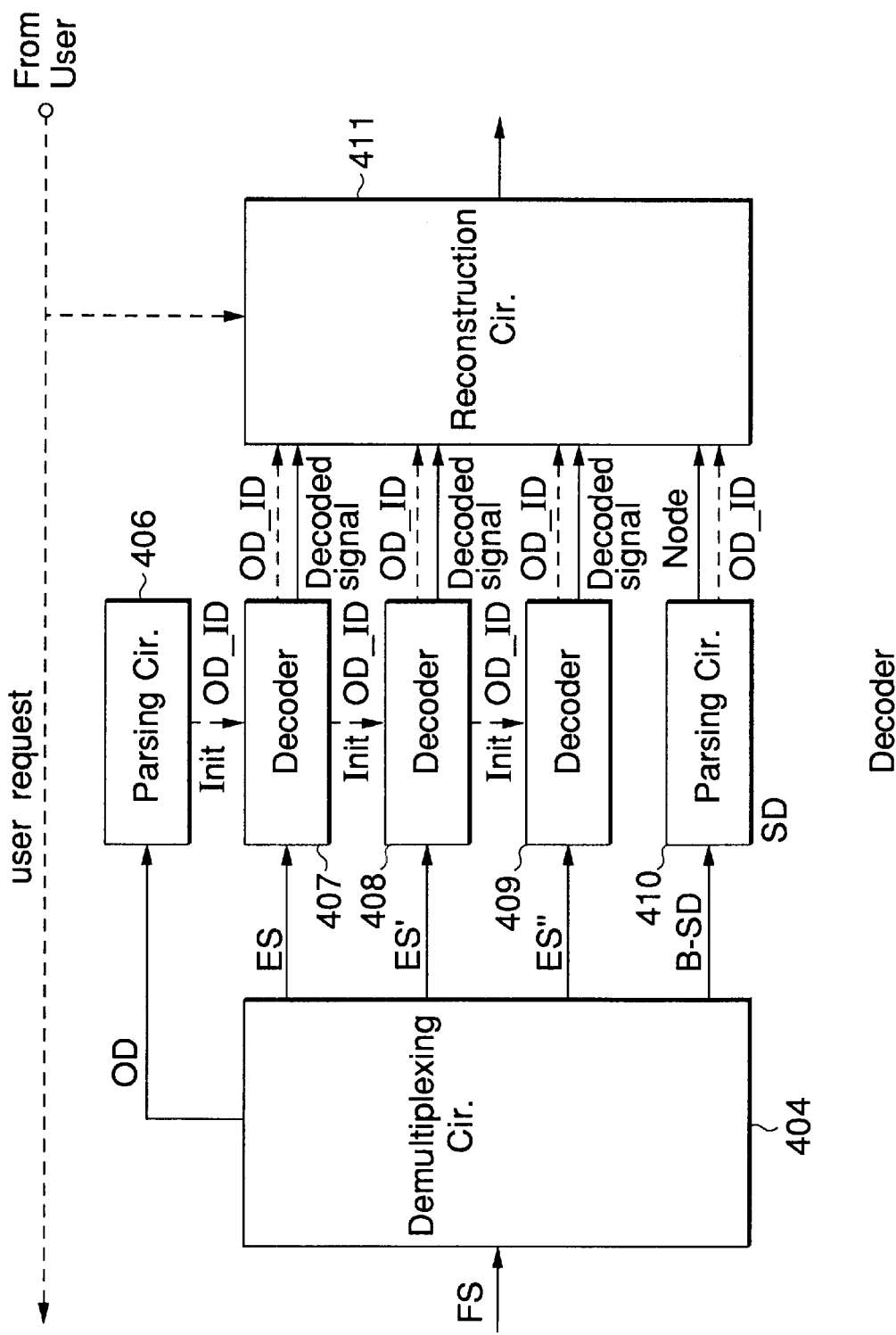
FIG. 8 is a block diagram showing an example of configuration of a first embodiment of decoding apparatus according to the invention.

Next, with reference to FIG. 8, an example of configuration of an embodiment of a decoding apparatus corresponding to the coding apparatus of FIG. 1 will be described. FIG. 8 is a block diagram showing an example of the configuration of an embodiment of a decoding apparatus according to the invention. In FIG. 8, a demultiplexing circuit 404 receives a multiplexed bit stream FS and then separates and extracts respective bit streams that constitute the multiplexed bit stream FS.

Figure 9:
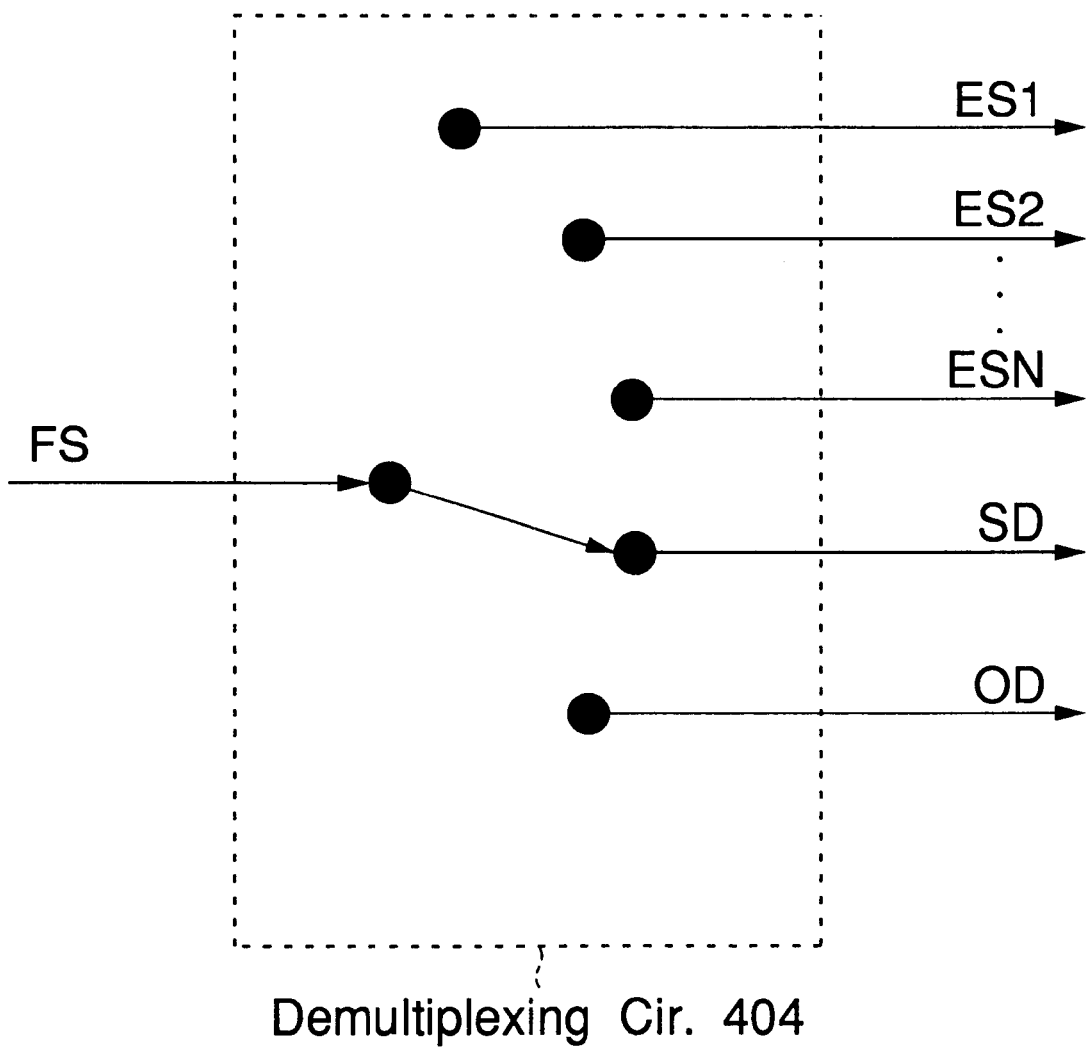
FIG. 9 shows an example of the detailed configuration of a demultiplexing circuit 404 shown in FIG. 8.

FIG. 9 shows an example of configuration of the demultiplexing circuit 404. As shown in FIG. 9, the demultiplexing circuit 404 detects a start code in the multiplexed bit stream FS and recognizes a presence of the respective bit streams.

And then, an input multiplexed bit stream FS is separated, with a switch, into a stream description SD and object descriptors OD which are output from corresponding terminals. Similarly, bit streams ES1–ESN of AV data are separated and output from corresponding terminals.

Returning to FIG. 8, a parsing circuit 406 receives the object descriptors OD that have been separated by the demultiplexing circuit 404, determines the kind and the number of decoders that are necessary for decoding the AV data (bit stream), and causes the bit streams of the respective AV data (bit stream) to be supplied to corresponding decoders. Further, the parsing circuit 406 reads out buffer capacities necessary for decoding the respective bit streams from the object descriptors OD, and supplies those (Init) to the respective decoders 407–409.

Still further, to allow determination as to what nodes the respective bit streams ES1–ESN belong to, the parsing circuit 406 outputs ID numbers OD_ID of respective object descriptors to the decoders that are to decode the bit streams described in the respective object descriptors OD.

The decoders 407–409 decode the bit streams according to a predetermined decoding method and corresponding to the encoding method, and output resulting video data or audio/sound data to a reconstruction circuit 411. Further, the decoders 407–409 output, to the reconstruction circuit 411, ID numbers OD_ID indicating what nodes the respective decoded data (video data or audio (sound) data) belong to. Still further, if the received bit stream is data (SZ, POS) indicating the size and display position of image and data (key data) indicating the degree of penetration of the image included in the bit stream, the decoders 407–409 decode, from the bit stream, the data (SZ, POS) indicating the size and display position of the image (image size and display position data) and data (key data) indicating the degree of penetration of the image, and output that data to the reconstruction circuit 411.

Although in the above embodiment three decoders 407–409 are provided for a case where N is equal to 3, it is understood that the number of decoders may be changed in accordance with data to be processed.

A parsing circuit 410 parses the scene description B-SD of the binary format and supplies the resulting data to the reconstruction circuit 411. Further, the parsing circuit 410 reads ID numbers OD_ID in the scene description B-SD that corresponds to the ID numbers OD_ID in the object descriptors and supplies those to the reconstructing circuit 411.

Figure 10:
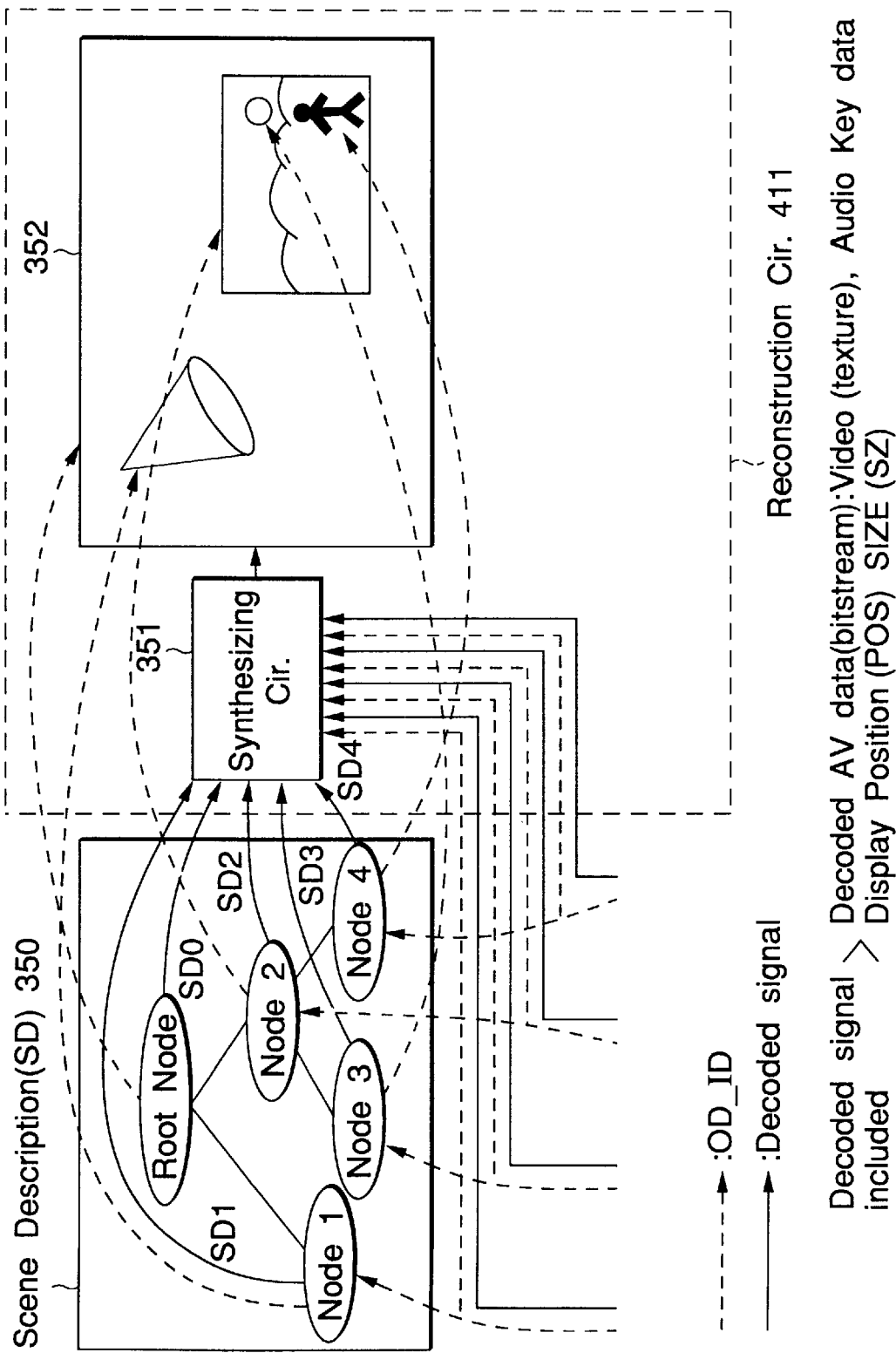
FIG. 10 shows an example of the configuration of a reconstruction circuit 411 shown in FIG. 8.

FIG. 10 shows a relationship among bit streams to reconstruct an entire image and an example of the reconstruction circuit 411. As shown in FIG. 10, the reconstruction circuit 411 comprises a synthesizing circuit 351; and an image signal that is produced by the synthesizing circuit 351 is supplied to a display device 352 and thereby the image is displayed there. In FIG. 10, the synthesizing circuit 351 and the display device 352 are shown as the reconstruction circuit 411. This is to show how the image that has been produced at the synthesizing circuit 351 is displayed in the display device 251. Actually the display device 352 is not included in the reconstruction circuit 209. The synthesizing circuit 351 receives the node data and ID number OD_ID that is supplied from the parse circuit 410 and the image data, the key data, the image size and display position information (SZ, POS), and ID numbers OD_ID that are supplied from the decoders 407–409, captures the image data corresponding to OD_ID, attaches the image data to the nodes based on the key data and the size and display position information, and outputs image signals corresponding to resulting image data to the display device 352.

Figure 11:
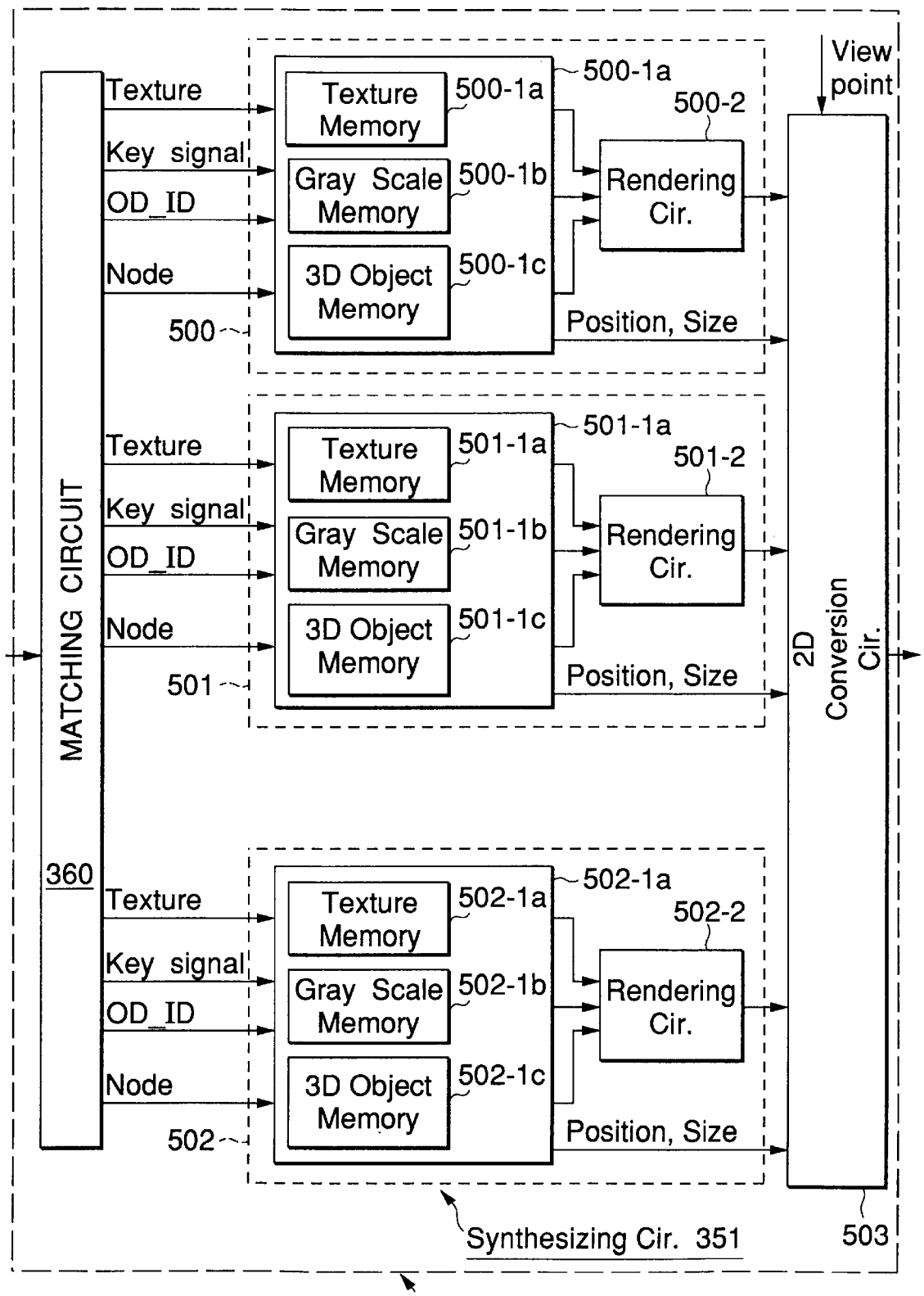
FIG. 11 is a block diagram showing an example of the detailed configuration of a synthesizing circuit shown in FIG. 9.

FIG. 11 is a block diagram showing an example of the reconstruction circuit 411. As shown in FIG. 11, the reconstruction circuit 411 comprises a matching circuit 360, object synthesizing circuits 500–502 and a two-dimensional conversion circuit 503. The object synthesizing circuit 500 comprises a memory group 500-1 and a rendering circuit 500-2. The memory group 500-1 comprises a texture memory 500-1*a*, a gray scale memory 500-1*b*, and a three-dimensional object memory 500-1*c*.

For example, the texture memory 500-1*a* stores AV data (bit stream) that is supplied from the decoder 407 as texture data. The gray scale memory 500-1*b* stores key data indicating the degree of penetration that is supplied from the decoder 407. The three-dimensional object memory 500-1*c* stores three-dimensional object information (node) that is output from the parsing circuit 410. The three-dimensional object information (node) includes polygon forming information, illumination information for illumination of polygons, and other information. The image size and display position data (SZ, POS) is also stored in a certain location, for example, the gray scale memory 500-1*b*.

The rendering circuit 500-2 generates a three-dimensional object using polygons based on the node stored in the three-dimensional object memory 500-1*c*. Further, the rendering circuit 500-2 receives the texture and the key data indicating the degree of penetration from the texture memory 500-1*a* and the gray scale memory 500-1*b*, respectively, attaches the texture to the corresponding node, and executes a process corresponding to the key data so that the texture has the preselected transparency. The data thus obtained are output to the two-dimensional conversion circuit 503. Further, the image size and display position data (SZ, POS) is output to the two-dimensional conversion circuit 503. Since the object synthesizing circuits 501 and 502 are configured in the same manner as the object synthesizing circuit 500, they are not described here. If the texture (the image data) is attached (mapped) to the object, it is necessary to recognize relationship between the texture and the object. To recognize the relationship, the ID numbers OD_ID described in the object descriptors OD and the ID numbers OD_ID described in the scene description B-SD are used. Therefore, the data that has been output to the reconstruction circuit 411 is first supplied to the matching circuit 360 before the data is supplied to the corresponding object synthesizing circuits 500–502. The ID numbers OD_ID described in the object descriptors OD are matched with the ID numbers OD_ID described in the scene description B-SD by a matching circuit 360 as shown in FIG. 8; and the relationship is found thereby.

The two-dimensional conversion circuit 503 converts, in accordance with view point information that is supplied externally and the image size and display position data that supplied from the object synthesizing circuits, the texture-attached objects that are output from the respective object synthesizing circuits 500–502 into a two-dimensional image signal through mapping to a two-dimensional plane. The resulting two-dimensional image signal is supplied to the display device 352 for display thereon.

Next, the operation of the above embodiment will be described with reference to FIG. 8. A multiplexed bit stream FS that has been transmitted via a transmission line is supplied to the demultiplexing circuit 404. The demultiplexing circuit 404 detects the start code in the multiplexed bit stream FS and also recognizes bit streams. The demultiplexing circuit 404 separates a scene description B-SD, and object descriptors OD, bit streams ES1–ESN corresponding to AV data (bit stream) from the multiplexed bit stream FS and outputs those by properly switching the switch shown in FIG. 9. The object descriptors OD are supplied to the parsing circuit 406, the bit streams ES1–ESN are supplied to the respective decoders 407–409, and the scene description B-SD of the binary format is supplied to the parsing circuit 410.

The parsing circuit 410 parses the scene description B-SD of the binary format that is output from the demultiplexing circuit 404 and supplies a result (three dimensional object information (NODE)) to the reconstruction circuit 411. Further, the parsing circuit 410 decodes ID numbers OD_ID of object descriptors OD of AV data (bit stream) to be attached to the nodes, and supplies those to the reconstruction circuit 411.

The parsing circuit 406 receives the object descriptors OD, recognizes the kind and the number of decoders necessary for decoding the bit streams, and causes the bit streams ES1–ESN to be supplied to the respective decoders. Further, the parsing circuit 406 reads out buffer capacities or a time stamp of each access unit necessary for decoding the respective bit streams from the object descriptors OD, and supplies those as an initialization information (Init) to the respective decoders 407–409. As a result, the decoders 407–409 perform initialization by referring to the supplied values (the initialization information (Init)). Further, to indicate what objects the bit streams that have been processed by the respective decoders 407–409 belong to, the parsing circuit 406 outputs the ID numbers OD ID of the respective object descriptors.

The decoders 407–409 perform initialization such as securing of a buffer in accordance with the initialization information that is supplied from the parsing circuit 406. When receiving the bit streams corresponding the AV data (bit streams) that are output from the demultiplexing circuit 404, the decoders 407–409 decode the respective bit streams by a predetermined method corresponding to the encoding operation, and outputs resulting video data or audio (sound) data to the reconstruction circuit 411.

Further, the decoders 407–409 output, to the reconstruction circuit 411, ID numbers OD_ID indicating what objects the bit streams that have been decoded by the respective decoders correspond to. Still further, if the decoded bit stream is an image, the decoders 407–409 output data indicating the size and display position of the image (SZ, POS) and data (key data) indicating the degree of penetration of the image.

As shown in FIG. 11, data that has been output to the reconstruction circuit 411 is supplied to the corresponding object synthesizing circuits 500–502. One object synthesizing circuit corresponds to each node. As described above, when the various type of data is supplied to the corresponding object synthesizing circuits 500–502, it is necessary to find what objects the bit streams that have been processed by the respective decoders 407–409 belong to. Therefore, the ID numbers OD_ID described in the object descriptors OD are collated (matched) by the matching circuit 360 with the ID numbers OD_ID described in the scene description B-SD before the data is supplied to the corresponding object synthesizing circuits. Whereby, it is possible to recognize the relationship between the decided signal (bit stream) and three-dimensional object information (NODE). The object synthesizing circuits 500–502 receive the decoded signal including ID numbers OD_ID that are indicated by the nodes from the decoders 407–409, respectively. If the received decoded signal is image data, the object synthesizing circuits 500–502 attach the image to a two-dimensional or three-dimensional object to be generated.

The above operation will be described below for the object synthesizing circuit 500 that is used as an example. The texture data to be attached to the object is stored in the texture memory 500-1a. The key data and ID number OD_ID are supplied to the gray scale memory 500-1b and stored there. The node (three-dimensional object information) is stored in the three-dimensional object memory 500-1c. Further, the image size and display position data (SZ, POS) is also stored in a certain location, for example, the gray scale memory 500-1b. ID number OD_ID is used to recognize the node.

The rendering circuit 500-2 reads out the node (three-dimensional object information) that is stored in the three-dimensional object memory 500-1c and generates a corresponding object by using polygons. Further, the rendering circuit 500-2 attaches the image data that is received from the texture memory 500-1a to the above-generated polygons by referring to the key data indicating the degree of penetration that is received from the gray scale memory 500-1b. Further, image size and display position data (SZ, POS) is read out from the gray scale memory 500-1b and supplied to the two-dimensional conversion circuit 503. Similar operations are performed by the object synthesizing circuits 501 and 502.

The two-dimensional conversion circuit 503 is supplied with the texture-attached two-dimensional or three-dimensional objects from the object synthesizing circuits 500–502. Based on view point information that is supplied externally and the image size and display position data (SZ, PCS), the two-dimensional conversion circuit 503 converts the three-dimensional objects into a two-dimensional image signal through mapping to a two-dimensional plane. The three-dimensional objects that have been converted into the two-dimensional image signal are output (displayed) on the display device 352.

If all the objects are two-dimensional ones, the outputs of the respective rendering circuits 500-2 to 502-2 are combined as they are in accordance with their degree of penetration (key data), and then output. In this case, no conversion is performed.

FIGS. 12–14 show structures of an object descriptor OD. FIG. 12 shows the entire structure of the object descriptor OD. In FIG. 12, "NodeId" on the third line is a 10-bit flag indicating the ID number of this descriptor, and corresponds to the above-mentioned ID number OD_ID. Item "streamCount" on the fourth line is an 8-bit flag indicating the number of AV data units (bit streams ES) included in the object descriptor OD. Therefore, items "ES_Descriptor" that are necessary for decoding the respective bit streams ES are transmitted in a number that is indicated by "streamCount." Item "extensionFlag" on the fifth line is a flag indicating whether to transmit other information. If the value of this flag is "1", other descriptors are transmitted.

"ES_Descriptor" on the eighth line is a descriptor indicating information relating to each bit stream. FIG. 13 shows details of "ES_Descriptor." In FIG. 13, "ES_number" on the third line is a 5-bit flag indicating an ID number for identification of the bit stream. Item "StreamType" on the 6th line indicates the format of the bit stream and, for instance, is an 8-bit flag indicating such data as an MPEG2 video. Item "QoS_Descriptor" is an 8-bit flag indicating a request to a network in a transmission. Item "ESConfigParams" on the 8th line is a descriptor that describes information necessary for decoding of the bit stream, and its details are shown in FIG. 14. The details of "ESConfigParams" are described in MPEG4 System.

In the above embodiment, in the decoding apparatus, a URL that is included in a node that constitutes three-dimensional space modeling data (VRML data) is replaced by the ID number OD_ID of an object descriptor OD corresponding to AV data (bit stream) that is designated by the URL. On the decoding side, an object descriptor OD corresponding to ID number OD_ID that is included in a node is searched for (collated), whereby corresponding data AV data (bit stream) is detected (recognized). Therefore, it becomes possible to transmit a CG image and a natural image that are multiplexed into the same stream while the method of describing a scene and a three-dimensional object is kept compatible with, for instance, the VRML scheme.

In the above embodiments coded audio and video data (AV data (bit stream)) are stored in the storage device 306. However, for example, they may be input directly from an audio or video coding apparatus without passing through such a storage device.

Although in the above embodiments AV data (bit stream), object descriptors OD, and a scene description SD are stored in separate storage devices, they may be stored in the same storage device or recording medium.

Furthermore, although a scene description SD is stored in advance as a file, AV data (bit stream) and object stream information OI may be generated on a real time basis at the time of transmission.

Next, with reference to FIG. 15, a second embodiment of a coding apparatus will be described according to the invention. In FIG. 15, the portions having corresponding portions in FIG. 1 are given the same reference symbols as the latter and will not be described In this embodiment, a URL changing circuit 309 is added to the embodiment of FIG. 1. The output data from the parsing circuit 307 and the output from the OD generation circuit 304 are supplied to the URL changing circuit 309, and then the output data from the URL changing circuit 309 is supplied to the BIFS encoder 308. The remaining configuration is the same as in the embodiment of FIG. 1.

The URL changing circuit 309 converts ID number OD_ID that is output from the OD generation circuit 304 into a corresponding character string of an ASCII format, and then outputs it. For example, a description will be made of an example in which object stream information OI that is necessary for decoding AV data (bit stream) to be attached to a certain node stored in the storage device 302 has the following address.

$$\text{http://serverA/AV\_scene1/object\_file.1} \qquad (1)$$

In this case, object stream information OI is read out from the storage device 305, and ID number OD_ID of an object descriptor OD corresponding to the object stream information OI is supplied from the OD generation circuit 304. The URL changing circuit 309 receives the ID number OD_ID and rewrites (changes) the URL to an appropriate character string of the ASCII format. For example, if OD_ID is "4", Expression (1) is rewritten (changed) to the following.

$$\text{mpeg4://4} \qquad (2)$$

Where a character string "mpeg" is at the head of a character string indicating a URL, and a character string (in this example, character "4") indicating a number that is located immediately after the character string "://" that follows "mpeg" indicates ID number OD_ID.

There may be a case where a URL described in a node that is stored in the storage device 302 designates a file existing in coding apparatus (on the network) that is different from the coding apparatus of FIG. 15. In such a case, the URL changing circuit 309 stops the conversion operation, and the URL of Expression (1), for instance, is supplied, as it is, to the BIFS encoder 308.

Next, the operation of this embodiment will be described briefly. When receiving a request signal REQ, the scene control circuit 301 determines what AV object should be transmitted by referring to a scene description SD that is stored in the storage device 302 based on the request signal REQ, and outputs a scene request signal SREQ to the storage device 302.

When receiving the scene request signal SREQ, the storage device 302 reads out a corresponding scene description SD (described in the ASCII format) and supplies it to the parsing circuit 307 and the BIFS encoder 308.

The parsing circuit 307 reads out a URL (indicating the address of an AV data (bit stream) file) included in a node that constitutes the supplied scene description SD, and outputs, to the storage device 306, a request signal ESREQ for output of AV data (bit stream) corresponding to the URL. As a result, the corresponding AV data (bit stream) ES is output from the storage device 306 and supplied to the multiplexing circuit 303.

Further, the parsing circuit 307 outputs, to the storage device 305, a request signal OIREQ for requesting output of object stream information OI relating to the AV data (bit stream) ES, indicated by the URL that is included in the node. As a result, the object stream information OI corresponding to the URL is output from the storage device 305 and supplied to the OD generation circuit 304. Still further, the parsing circuit 307 outputs to the URL changing circuit 309, the URL that is included in the node.

The OD generation circuit 304 extracts, as an object descriptor OD, only the object stream information requested by the OIREQ from the object stream information OI relating to the AV object that is supplied from the storage circuit 305. Further, the OD generation circuit 304 generates an ID number OD_ID, records it in the object descriptor OD, and outputs the resulting object descriptor OD to the multiplexing circuit 303. Still further, the OD generation circuit 304 outputs the ID number OD_ID that has been generated for each object descriptor OD to the URL changing circuit 309.

If the URL that has been supplied from the parsing circuit 307 designates a file existing in another server on the network, the URL changing circuit 309 outputs, as it is, the URL to the BIFS encoder 308. If the supplied URL designates an AV data (bit stream) file stored in the storage device 306, the URL changing circuit 309 generates a character string such as that of Expression (2) by referring to ID number OD_ID that is output from the OD generation circuit 304, and outputs the character string to the BIFS encoder 308.

The BIFS encoder 308 converts the scene description SD of an ASCII format that is supplied from the storage device 302 into a scene description B-SD of a binary format by a predetermined method and replaces the URL included in the scene description SD with the URL or the character string supplied from the OD generation circuit 304. Thereafter, the scene description B-SD of the binary format is output to the multiplexing circuit 303.

FIG. 16 shows an example of a scene description SD in binary format for attachment of a moving picture as a texture. A URL on the 29th line is a character string of an ASCII format that is output from the URL changing circuit 309. That is, in this embodiment, a URL is described as a character string in binary format.

FIG. 17 shows an example of a binary format of a scene description SD for attachment of a still picture as a texture. As in the case of FIG. 16, a URL on the 17th line of FIG. 17 is a character string of an ASCII format.

The scene descriptor SD that has been converted into a binary format by the BIFS encoder 308 is supplied to the multiplexing circuit 303, and multiplexed with the object descriptors OD and the AV data (bit stream) ES. The resulting multiplexed bit stream FS is output from the multiplexing circuit 303. The multiplexed bit stream FS is supplied to decoding apparatus via a transmission line, for example.

Next, with reference to FIG. 18, a description will be made of an embodiment of decoding apparatus corresponding to the coding apparatus of FIG. 15. FIG. 18 is a block diagram showing a second embodiment of decoding apparatus according to the invention. In FIG. 18, the portions corresponding to the portions in FIG. 8 are given the same reference symbols as the latter and will not be described.

In the embodiment of FIG. 18, a URL conversion circuit 412 is added to the embodiment of FIG. 8. Further, a parsing circuit 410 supplies information that is expressed as a character string of ASCII format. The remaining configuration is the same as in the embodiment of FIG. 8. The URL changing circuit 412 converts the information expressed as a character string of ASCII format into ID number OD_ID that is the ID of a corresponding object descriptor OD, and supplies it to the reconstruction circuit 411.

Next, the operation of this embodiment will be described briefly. The URL that has been extracted from a node by the parsing circuit 410 is supplied to the URL conversion circuit 412. If the URL is a character string having, for instance, a format of Expression (2), the URL conversion circuit 412 converts the character string into ID number OD_ID and supplies it to the reconstruction circuit 411. As a result, the reconstruction circuit 411 attaches corresponding AV data as a texture to the node based on the ID number OD-ID included in the node.

If, however, the extracted URL designates a file that is stored in another server on the network (the URL is a character string having, for instance, a format of Expression (1)), the URL changing circuit 412 supplies the information to the demultiplexing circuit 404, and then the demultiplexing circuit 404 issues a file transmission request to that server. As a result, a multiplexed bit stream FS' is transmitted through execution of a similar process, and a display operation is performed.

According to the above embodiment, even if AV data (bit stream) ES to be attached to a node exists in another server on the network, the desired AV data (bit stream) can be acquired and displayed.

Figure 19:
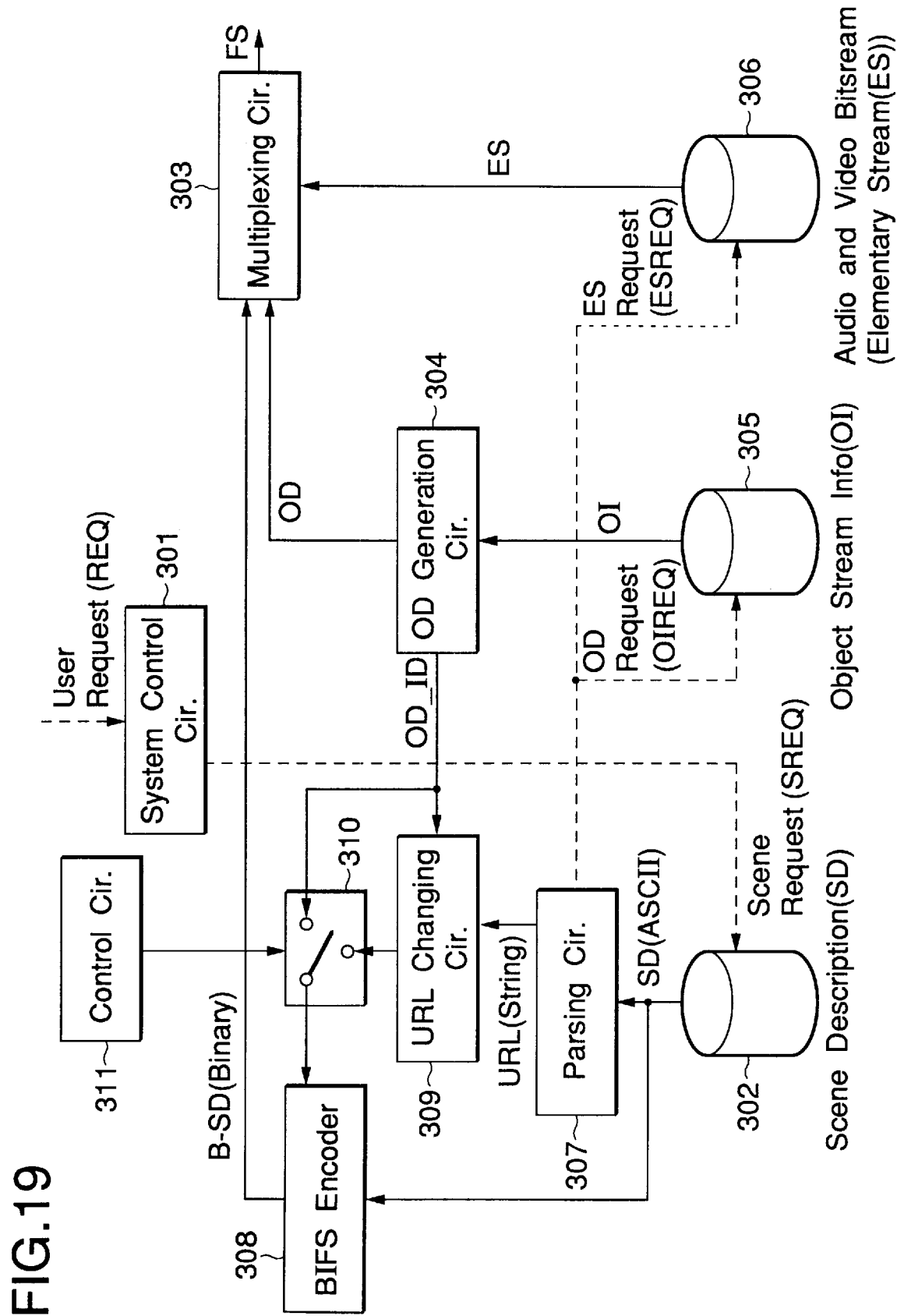
FIG. 19 is a block diagram showing an example of the configuration of a third embodiment of coding apparatus according to the invention.

Next, with reference to FIG. 19, a description will be made of a third embodiment of coding apparatus according to the invention. FIG. 19 is a block diagram showing the third embodiment of the coding apparatus according to the invention. In FIG. 19, those portions having corresponding portions in FIG. 1 are given the same reference symbols as the latter and will not be described.

In the embodiment of FIG. 19, a URL changing circuit 309, a switch 310, and a control circuit 311 are added to the embodiment of FIG. 1. Further, the output data from the parsing circuit 307 and the ID number OD_ID from the OD generation circuit 304 are supplied to the URL changing circuit 309. The output data from the URL changing circuit 309 and ID number OD_ID from the OD generation circuit 304 are supplied to the switch 310, and the control circuit 311 controls the switch 310. The remaining configuration is the same as in the embodiment of FIG. 1.

The URL changing circuit 309 converts ID number OD_ID that is output from the OD generation circuit 304 into a corresponding character string of ASCII format and outputs it. Since the operation of the URL changing circuit 309 was described in the second embodiment of FIG. 15, it is not described here.

Controlled by the control circuit 311, the switch 310 selects one of ID number OD_ID that is output from the OD generation circuit 304 and the URL that is output from the URL changing circuit 309, and outputs the selected OD_ID or URL to the BIFS encoder 308. The control circuit 311 controls the switching of the switch 310 in accordance with the type of application, for instance. Next, the operation of this embodiment will be described briefly.

A URL whose format has been converted by the URL changing circuit 309 (the details are explained in the second embodiment and will not be described here) is supplied to the switch 310. Similarly, ID number OD_ID that has been output from the OD generation circuit 304 is supplied to the switch 310.

The connection of the switch 310 is changed under the control of the control circuit 311. For example, for real time communication or hardware design, it is advantageous that ID number OD_ID be directly described as a numeral in the form of, for instance, a 10-bit flag rather than a character string. Therefore, in such an application, the switch 310 is controlled by the control circuit 311 so as to select the output data from the OD generation circuit 304, in which case ID number OD_ID is recorded in a scene description B-SD of binary format by the BIFS encoder 308. If AV data (bit stream) that is designated by a URL is stored in another server on the network, the control circuit 311 controls the switch 310 to change its connection so that the output data from the URL changing circuit 309 is selected, whereby the URL is output to and recorded by the BIFS encoder 308.

On the other hand, in the case of an application on a computer, it is advantageous that a stream be designated by a URL of a character string, because of high degree of flexibility. Therefore, in such an application, the switch 310 is controlled so as to make a connection to the URL changing circuit 309, whereby a URL is recorded in a scene description B-SD of binary format by the BIFS encoder 308.

FIG. 20 shows an example of binary format of a scene description B-SD for attachment of a moving picture as a texture. In FIG. 20, "isString" on the 29th and 30th lines is a 1-bit flag indicating whether ID number OD_ID or a URL is described. If this value is "0", ID number OD_ID of 10 bits is recorded in the node. If the value of "isString" is "1", a URL is recorded. The URL is a character string that has been rewritten by the URL changing circuit 309 so as to indicate ID number OD_ID of a moving picture to be attached to the node.

FIG. 20 shows an example of a binary format of a scene description B-SD for attachment of a still picture as a texture. In this figure, as in the above case, "isString" on the 17th and 18th lines is a 1-bit flag indicating whether ID number OD_ID or a URL is described.

A multiplexed stream FS that has been coded by the above coding apparatus is transmitted to decoding apparatus via a transmission line.

Figure 22:
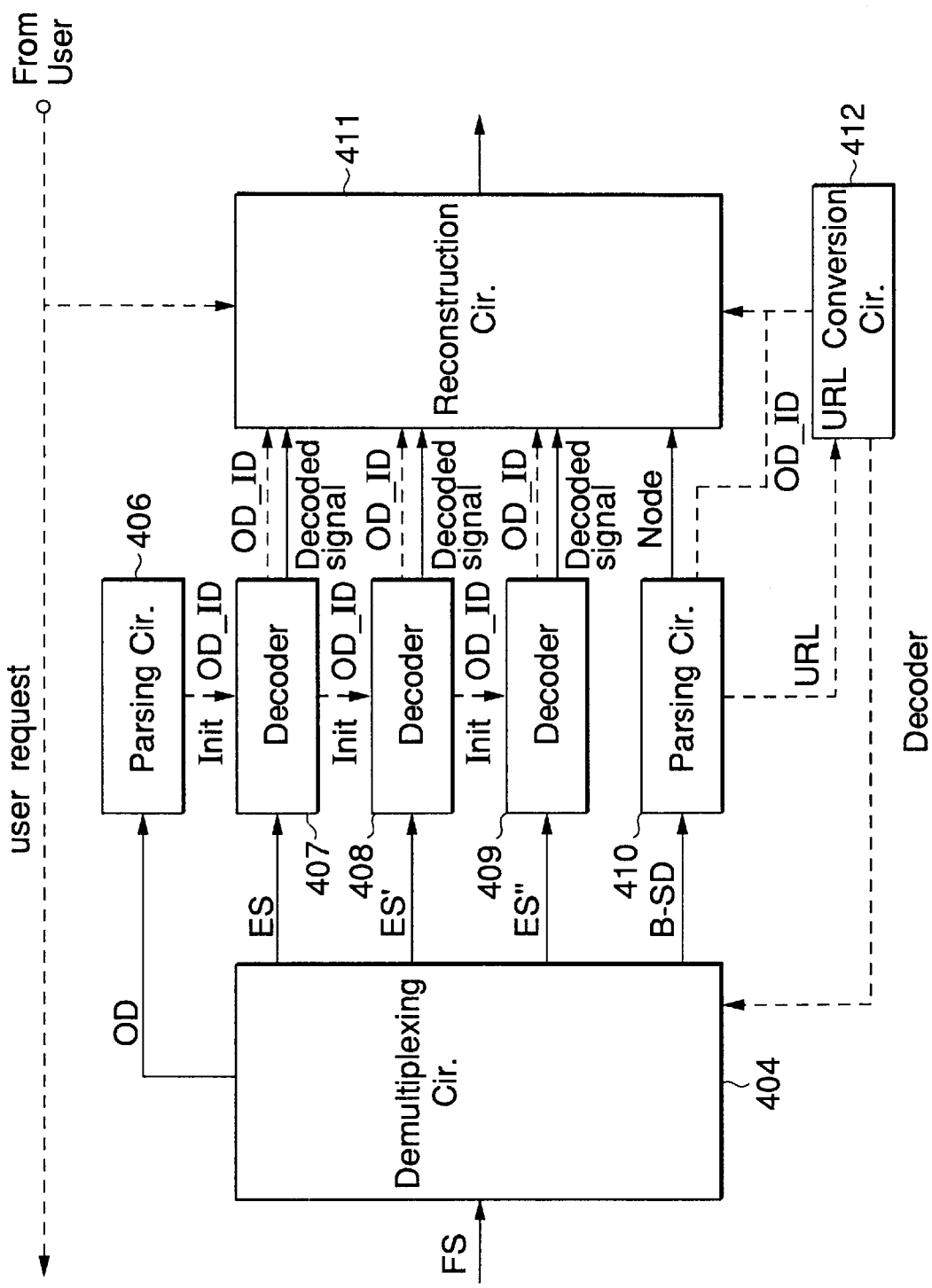
FIG. 22 is a block diagram showing an example of the configuration of a third embodiment of decoding apparatus according to the invention.
Figure 23:
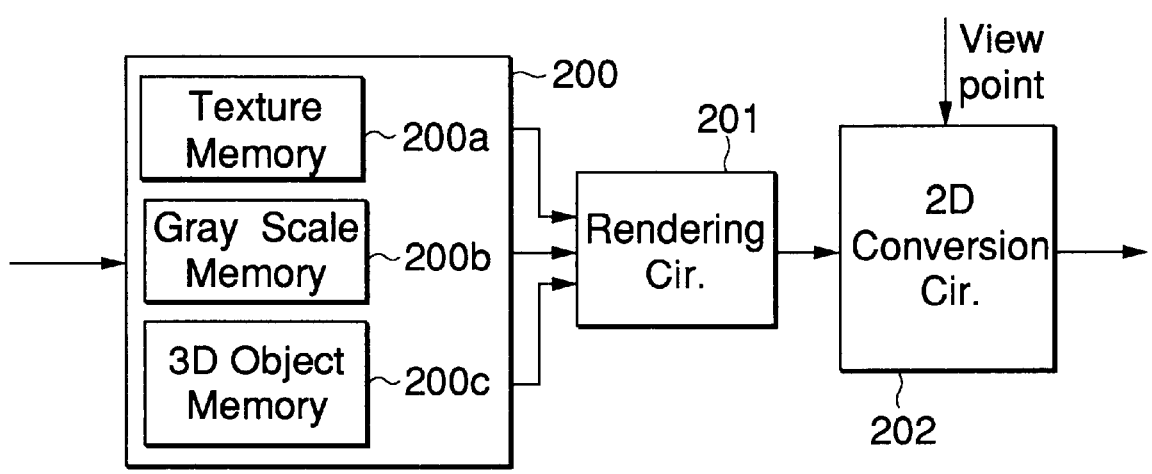
FIG. 23 is a block diagram for texture mapping.
Figure 24:
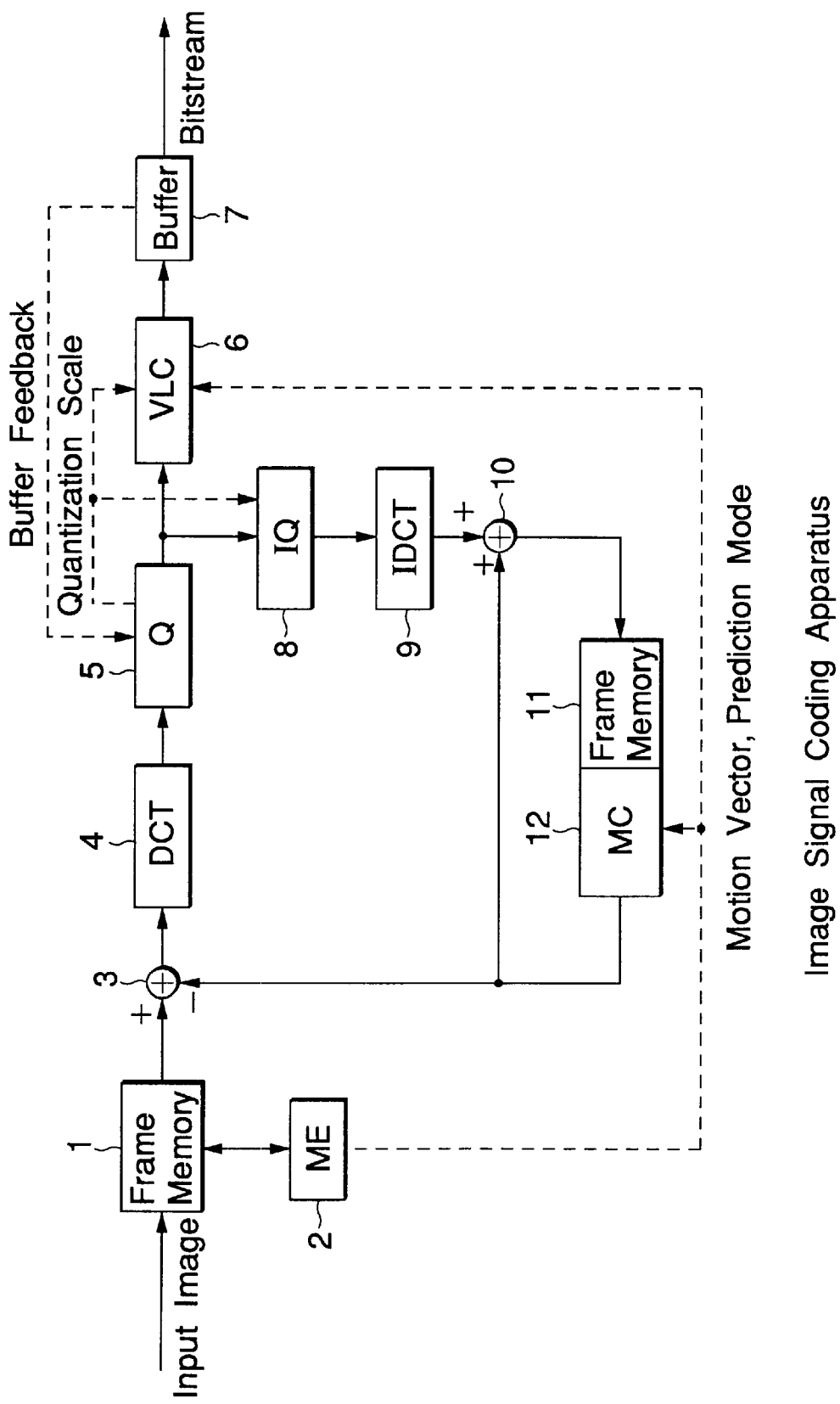
FIG. 24 is a block diagram showing an example of an encoder of MP@ML of the MPEG scheme.
Figure 25:
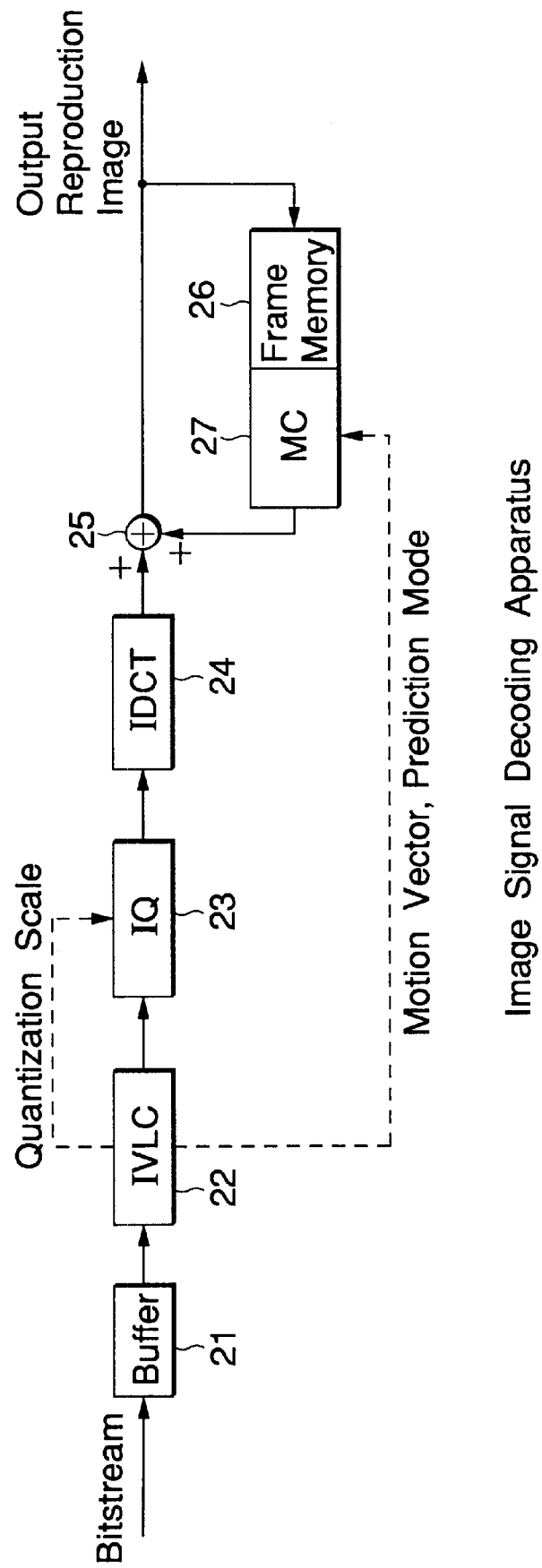
FIG. 25 is a block diagram showing an example of a decoder of MP@ML of the MPEG scheme.
Figure 26:
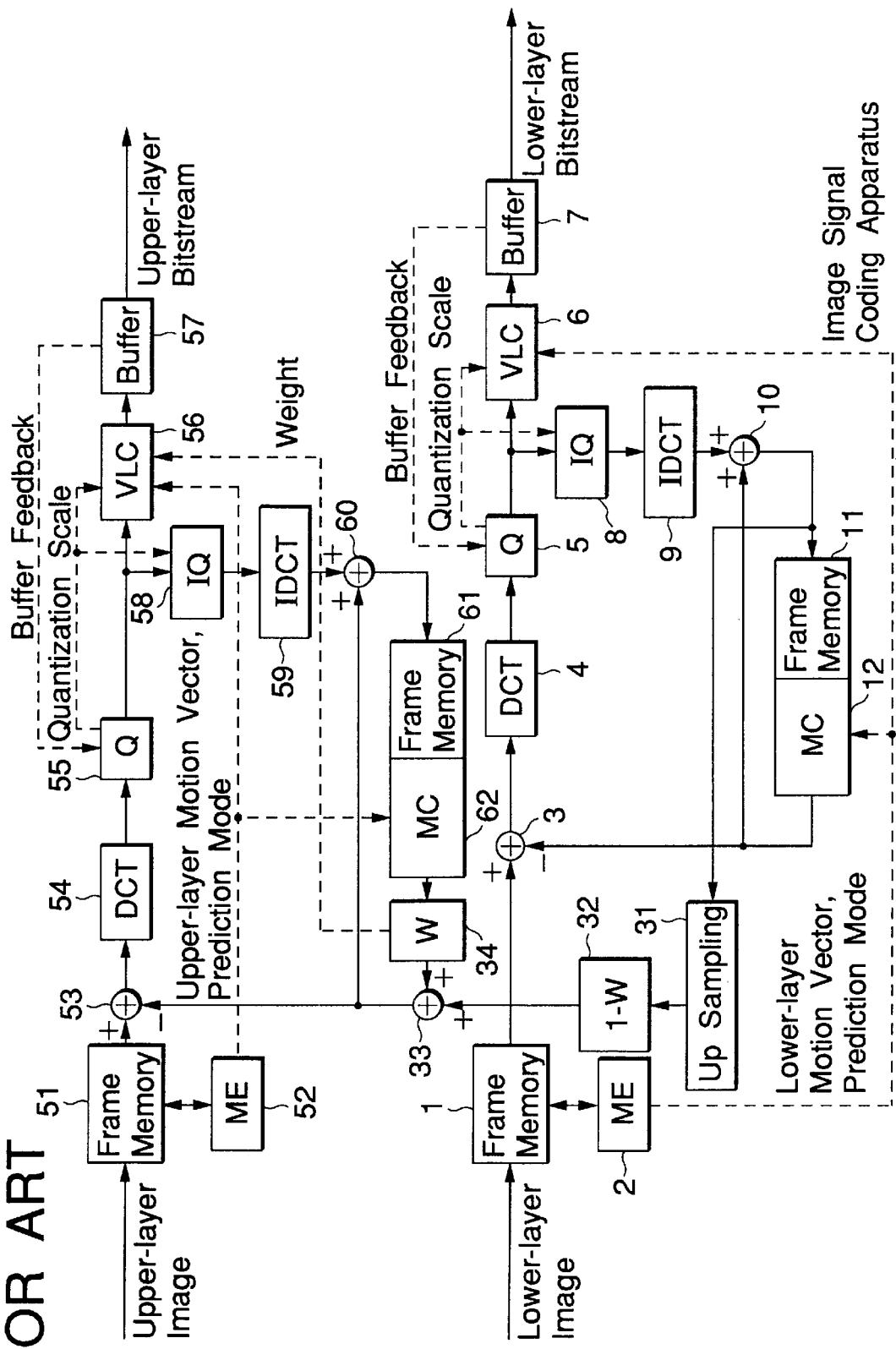
FIG. 26 is a block diagram showing an example of an encoder of spatial scalability.
Figure 27:
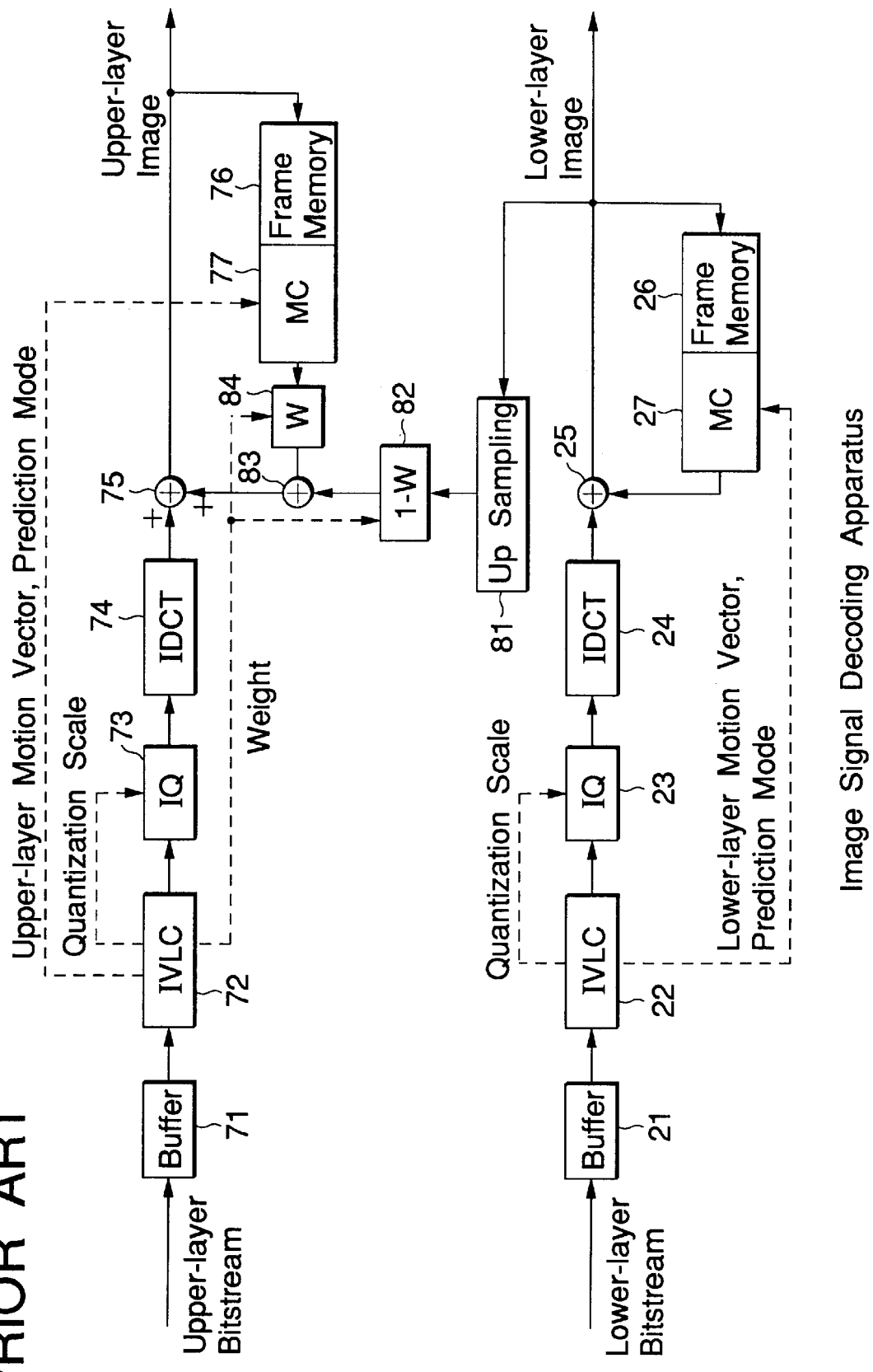
FIG. 27 is a block diagram showing an example of a decoder of spatial scalability.

FIG. 22 is a block diagram showing the third embodiment of decoding apparatus corresponding to the coding apparatus of FIG. 19 according to the invention. In FIG. 22, those portions having corresponding portions in FIG. 8 are given the same reference symbols as the latter and will not be described further.

In the embodiment of FIG. 22, a URL conversion circuit 412 is added to the embodiment of FIG. 8. The remaining configuration is the same as in the embodiment of FIG. 8.

In this embodiment, the parsing circuit 410 decodes "isString". If this value is "1", the parsing circuit 410 supplies a URL to the URL conversion circuit 412. If this value is "0", the parsing circuit 410 decodes ID number OD_ID and supplies a result to the reconstruction circuit 411.

If the URL is described in the form of, for instance, Expression (2), the URL conversion circuit 412 decodes ID number OD_ID and outputs a result to the reconstruction circuit 411. If the URL indicates a file existing in another server, the information is supplied to the demultiplexing circuit 404 and the demultiplexing circuit 404 accesses that server and reads out the desired file.

Next, the operation of this embodiment will be described briefly. A read-out scene description SD (node) is supplied to the parsing circuit 410 and analyzed therein. The parsed scene description is supplied to the reconstruction circuit 411. Further, the parsing circuit 410 decodes "isString" and judges whether its value is "1". If this value is judged to be "1", the parsing circuit 410 supplies the URL conversion circuit 412 with a URL of AV data (bit stream) to be attached, as a texture, to the node. If the URL is described in the form of, for instance, Expression (2) (i.e., the head of the character string is "mpeg4"), the URL conversion circuit 412 decodes ID number OD_ID that is the ID of an object descriptor OD from the character strings and outputs it to the reconstruction circuit 411. If the URL designates a file existing in another server, the information is supplied to the demultiplexing circuit 404 and the demultiplexing circuit 404 accesses that server, requests the server to transfer the desired file, and receives it. Even when communication is made with a plurality of servers, each server operates in the same manner as described above.

On the other hand, if "isString" is "0", the parsing circuit 410 decodes ID number OD_ID and outputs a result to the reconstruction circuit 411. The remaining operation is the same as in the first embodiment and is not described hereinbelow.

According to the above embodiment, the most appropriate coding method can be selected in accordance with the type of application.

In accordance with the invention, a recording medium such as a disc, DVD-R, CD-R, CD-ROM, etc., contains encoded picture signals generated by the encoding method as noted above; and these encoded picture signals are decoded when reproduced from the recording medium.

While the encoding and decoding apparatus and method according to this invention have been shown with respect to block diagrams, in addition to providing different physical elements for each block, the method and apparatus may be implemented on a multi-purpose (general) computer being programmed for this use. In this regard, the recording medium or other storage device may contain operating instructions (program source code or software) to perform each of the steps set forth in the methods for encoding and decoding operations as noted hereinabove. It should also be noted that instead of the recording medium, a transmission channel connected to a communications network or the like (for example, the Internet, digital satellite, etc.) may be provided to receive and transmit data from an encoder, and to decode the encoded data.

The encoding and decoding apparatus and method in accordance with the invention may be employed for encoding and decoding information from a digital video disc, a picture data base, picture compression and expansion units, a picture downloaded from the Internet, or software modules implementing these systems, by way of example.

In the coding apparatus, the coding method and the recording medium, three-dimensional space modeling data (VRML data) is input and data (AV data stream) are also input. A location indication data (URL) included in a node of the input three-dimensional space modeling data (VRML data) is extracted. The extracted location indication data (URL) is converted into a stream ID corresponding to data (AV data stream) designated by the location indication data (URL). The location indication data (URL) of the node is replaced by the stream ID obtained by the conversion. Three-dimensional space modeling data (VRML data) obtained by the replacement and the AV data are multiplexed into the same stream. Therefore, it becomes possible to transmit an object that is described as three-dimensional space modeling data (VRML data) and a natural image that is compressed according to, for instance, the MPEG scheme in a state that they are multiplexed into the same stream.

In the decoding apparatus, the decoding method and the recording medium, nodes are extracted from multiplexed data and data (AV data (bit stream)) are extracted from the multiplexed data. Information indicating a correlation between the nodes and the data (AV data (bit stream)) is extracted from the nodes. The nodes are collated (matched) with the data (AV data (bit stream)) based on the extracted information indicating the correlation. The nodes and the data (AV data (bit stream)) are combined based on a correlation result. Therefore, it becomes possible to decode data that has been transmitted in a state that an object that is described as three-dimensional space modeling data (VRML data) and a natural image that is compressed according to, for instance, the MPEG scheme are multiplexed into the same data stream.

It will thus be seen that the object set forth above, among those made apparent from the preceding description, are efficiently obtained and, since certain changes may be made in carrying out the above method and in the construction set forth without departing from the spirit and scope of the invention, it is intended that all matter contained in the above description and shown in the accompanying drawings interpreted as illustrative and not in a limiting sense.

It is also to be understood that the following claims are intended to cover all generic and specific features of the invention herein described; and all statements of the scope of the invention which, as a matter of language, might be said to fall therein.

What is claimed is:

1. A method for producing three dimensional space modeling data defined by a plurality of nodes and image/audio data specified by a position included in the nodes, said method comprising:

extracting a respective position from a node of said three dimensional space modeling data;

converting the extracted position into a stream ID corresponding to image/audio data associated with said position;

replacing said position with said stream ID; and multiplexing said image/audio data and said three dimensional space modeling data including said stream ID such that a bit stream is produced;

whereby said three dimensional space modeling data, said image/audio data and said stream ID are multiplexed according to a uniform format such that the format of said stream is determined prior to said multiplexing.

2. The method according to claim 1, wherein said bit stream includes additional information that includes said stream ID and that defines said image/audio data, said additional information having been multiplexed with said image/audio data and three dimensional space modeling data in said bit stream.

3. The method according to claim 1, wherein said three dimensional space modeling data is described by Virtual Reality Modeling Language (VRML), said position is represented by Uniform Resource Locator (URL) expressed in ASCII format, and said stream ID is expressed in binary format.

4. The method according to claim 3, further comprising converting said stream ID into a character string, and determining whether to replace said position of said image/audio data with said stream ID or said character string depending on whether said image/audio data is supplied by the same server or different servers.

5. The method according to claim 4, wherein said bit stream includes additional information that includes said stream ID and that defines said image/audio data, said additional information having been multiplexed with said image/audio data and three dimensional space modeling data in said bit stream.

6. A method for producing three dimensional space modeling data defined by a plurality of nodes and image/audio data specified by a position included in the nodes, said method comprising:

extracting a respective position from a node of said three dimensional space modeling data;

converting the extracted position into a stream ID corresponding to image/audio data associated with said position;

converting said stream ID into a character string;

replacing said position with said character string; and multiplexing said image/audio data and said three dimensional space modeling data including said character string such that a bit stream is produced;

whereby said three dimensional space modeling data, said image/audio data and said stream ID are multiplexed according to a uniform format such that the format of said stream is determined prior to said multiplexing.

7. The method according to claim 6, wherein said position is replaced with said character string depending on whether said image/audio data is supplied by the same server or different servers.

8. The method according to claim 6, wherein said three dimensional space modeling data is described by Virtual Reality Modeling Language (VRML), said position is represented by Uniform Resource Locator (URL) expressed in ASCII format, and said stream ID is expressed in binary format.

9. The method according to claim 6, wherein said bit stream includes additional information that includes said stream ID and that defines said image/audio data, said additional information having been multiplexed with said image/audio data and three dimensional space modeling data in said bit stream.

10. Apparatus for producing three dimensional space modeling data defined by a plurality of nodes and image/audio data specified by a position included in the nodes, comprising:

means for extracting a respective position from a node of said three dimensional space modeling data;

means for converting the extracted position into a stream ID corresponding to image/audio data associated with said position;

means for replacing said position with said stream ID; and means for multiplexing said image/audio data and said three dimensional space modeling data including said stream ID such that a bit stream is produced;

whereby said three dimensional space modeling data, said image/audio data and said stream ID are multiplexed according to a uniform format such that the format of said stream is determined prior to said multiplexing.

11. The apparatus according to claim 10, wherein said bit stream includes additional information that includes said stream ID and that defines said image/audio data, said additional information having been multiplexed with said image/audio data and three dimensional space modeling data in said bit stream.

12. The apparatus according to claim 10, wherein said three dimensional space modeling data is described by Virtual Reality Modeling Language (VRML), said position is represented by Uniform Resource Locator (URL) expressed in ASCII format, and said stream ID is expressed in binary format.

13. The apparatus according to claim 12, further comprising means for converting said stream ID into a character string, and means for determining whether to replace said position of said image/audio data with said stream ID or said character string depending on whether said image/audio data is supplied by the same server or different servers.

14. The apparatus according to claim 13, wherein said bit stream includes additional information that includes said stream ID and that defines said image/audio data, said additional information having been multiplexed with said image/audio data and three dimensional space modeling data in said bit stream.

15. Apparatus for producing three dimensional space modeling data defined by a plurality of nodes and image/audio data specified by a position included in the nodes, comprising:

means for extracting a respective position from a node of said three dimensional space modeling data;

means for converting the extracted position into a stream ID corresponding to image/audio data associated with said position;

means for converting said stream ID into a character string;

means for replacing said position with said character string; and means for multiplexing said image/audio data and said three dimensional space modeling data including said character string such that a bit stream is produced;

whereby said three dimensional space modeling data, said image/audio data and said stream ID are multiplexed according to a uniform format such that the format of said stream is determined prior to said multiplexing.

16. The apparatus according to claim 15, wherein said position is replaced with said character string depending on whether said image/audio data is supplied by the same server or different servers.

17. The apparatus according to claim 15, wherein said three dimensional space modeling data is described by Virtual Reality Modeling Language (VRML), said position is represented by Uniform Resource Locator (URL) expressed in ASCII format, and said stream ID is expressed in binary format.

18. The apparatus according to claim 15, wherein said bit stream includes additional information that includes said stream ID and that defines said image/audio data, said additional information having been multiplexed with said image/audio data and three dimensional space modeling data in said bit stream.

19. A method for processing a bit stream including image/audio data and three dimensional space modeling data comprising a plurality of nodes to produce a display image, said method comprising:
  receiving said bit stream;
  demultiplexing the received bit stream into a stream ID, said three dimensional space modeling data and image/audio data; and
  providing a correspondence between said image/audio data and a respective node in accordance with said stream ID such that said display image is produced;
  whereby said three dimensional space modeling data, said image/audio data and said stream ID are multiplexed according to a uniform format such that the format of said stream is determined prior to said multiplexing.

20. The method according to claim 19, wherein said three dimensional space modeling data is described by Virtual Reality Modeling Language (VRML) and said stream ID information is expressed in binary format.

21. The method according to the claim 19, wherein the correspondence between said image/audio data and node information is in accordance with either said stream ID expressed by a first expression or a character string corresponding to said stream ID expressed by a second expression; and wherein said node includes a flag for indicating whether said first or second expression has been used depending on whether said image/audio data has been supplied by the same server or different servers.

22. The method according to claim 19, wherein said bit stream includes additional information that includes said stream ID and that defines said image/audio data, said additional information having been multiplexed with said image/audio data and three dimensional space modeling data in said bit stream; and wherein said stream ID included in said node is collated with said stream ID included in said additional information.

23. A method for processing a bit stream including image/audio data and three dimensional space modeling data comprising a plurality of nodes to produce a display image, said method comprising:
  receiving said bit stream including said image/audio data and said three dimensional space modeling data comprising the nodes, and outputting said three dimensional space modeling data and image/audio data;
  converting character string information into stream ID information, said character string information being information indicating a correlation between a node and said image/audio data; and
  linking said image/audio data and said node in accordance with the converted stream ID information;
  whereby said three dimensional space modeling data, said image/audio data and said stream ID are multiplexed according to a uniform format such that the format of said stream is determined prior to said multiplexing.

24. The method according to the claim 23, wherein said information indicating the correlation is one of said character string information corresponding to said stream ID information and position designation information; wherein said image/audio data is linked to said node in accordance with the converted stream ID information if said information indicating the correlation is said character string information, and said image/audio data is linked from a supplying portion designated by said position designation information to said node in case that said information indicating the correlation is said position designation information.

25. The method according to claim 23, wherein said three dimensional space modeling data is described by Virtual Reality Modeling Language (VRML), said character string information is expressed in ASCII format, and the converted stream ID information is expressed in binary format.

26. The method according to claim 23, wherein said bit stream includes information defining said image/audio data and including said stream ID; and wherein the converted stream ID information is collated with the stream ID information included in the information defining said image/audio data, and said image/audio data is linked to said node in accordance with the result of collation.

27. Apparatus for processing a bit stream including image/audio data and three dimensional space modeling data comprising a plurality of nodes to produce a display image, comprising:
  means for receiving said bit stream;
  means for demultiplexing the received bit stream into a stream ID, said three dimensional space modeling data and image/audio data; and
  means for providing a correspondence between said image/audio data and a respective node in accordance with said stream ID such that said display image is produced;
  whereby said three dimensional space modeling data, said image/audio data and said stream ID are multiplexed according to a uniform format such that the format of said stream is determined prior to said multiplexing.

28. The apparatus according to claim 27, wherein said three dimensional space modeling data is described by Virtual Reality Modeling Language (VRML) and said stream ID information is expressed in binary format.

29. The apparatus according to the claim 27, wherein the correspondence between said image/audio data and node information is in accordance with either said stream ID expressed by a first expression or a character string corresponding to said stream ID expressed by a second expression; and wherein said node includes a flag for indicating whether said first or second expression has been used depending on whether said image/audio data has been supplied by the same server or different servers.

30. The apparatus according to claim 27, wherein said bit stream includes additional information that includes said stream ID and that defines said image/audio data, said additional information having been multiplexed with said image/audio data and three dimensional space modeling data in said bit stream; and wherein said stream ID included in said node is collated with said stream ID included in said additional information.

31. Apparatus for processing a bit stream including image/audio data and three dimensional space modeling data comprising a plurality of nodes to produce a display image, comprising:
  means for receiving said bit stream including said image/audio data and said three dimensional space modeling data comprising the nodes;
  means for outputting said three dimensional space modeling data and image/audio data;
  means for converting character string information into stream ID information, said character string information being information indicating a correlation between a node and said image/audio data; and
  means for linking said image/audio data and said node in accordance with the converted stream ID information;
  whereby said three dimensional space modeling data, said image/audio data and said stream ID are multiplexed according to a uniform format such that the format of said stream is determined prior to said multiplexing.

32. The apparatus according to the claim 31, wherein said information indicating the correlation is one of said character string information corresponding to said stream ID information and position designation information; wherein said image/audio data is linked to said node in accordance with the converted stream ID information if said information indicating the correlation is said character string information, and said image/audio data is linked from a supplying portion designated by said position designation information to said node in case that the information indicating the correlation is said position designation information.

33. The apparatus according to claim 31, wherein said three dimensional space modeling data is described by Virtual Reality Modeling Language (VRML), said character string information is expressed in ASCII format, and the converted stream ID information is expressed in binary format.

34. The apparatus according to claim 31, wherein said bit stream includes information that defines said image/audio data and that includes said stream ID; and wherein the converted stream ID information is collated with the stream ID information included in said information defining said image/audio data, and said image/audio data is linked to said node in accordance with the result of collation.

35. A recording medium having recorded thereon a data producing program for producing three dimensional space modeling data comprising a plurality of nodes and image/audio data designated by position designation information included in the nodes of said three dimensional space modeling data, said data producing program being executed to perform the steps of:
  extracting position designation information included in a node of said three dimensional space modeling data;
  converting the extracted position designation information into stream ID information corresponding to said image/audio data designated by the extracted position designation information;
  replacing the position designation information included in said node with said stream ID information; and
  multiplexing said image/audio data and three dimensional space modeling data including said stream ID information such that a bit stream is produced;
  whereby said three dimensional space modeling data, said image/audio data and said stream ID are multiplexed according to a uniform format such that the format of said stream is determined prior to said multiplexing.

36. The recording medium according to claim 35, wherein said data producing program being further executed to perform the steps of:
  converting said stream ID information into character string information being expressed by a first expression; and
  determining whether to replace said position designation information included in said node with said stream ID information expressed by a second expression or with said character string information expressed by said first expression, wherein said position designation information included in said node is replaced in accordance with the determined result.

37. A recording medium having recorded thereon a data producing program for producing three dimensional space modeling data comprising a plurality of nodes and image/audio data designated by position designation information included in the nodes of said three dimensional space modeling data, said data producing program being executed to perform the steps of:
  extracting position designation information included in a node of said three dimensional space modeling data;
  converting the extracted position designation information into stream ID information corresponding to image/audio data designated by the extracted position designation information;
  converting said stream ID information into character string information;
  replacing said position designation information included in said node with said character string information; and
  multiplexing said image/audio data and three dimensional space modeling data including said character string information such that a bit stream is produced;
  whereby said three dimensional space modeling data, said image/audio data and said stream ID are multiplexed according to a uniform format such that the format of said stream is determined prior to said multiplexing.

38. A recording medium having recorded thereon a data processing program for producing a display image from a bit stream including image/audio data and three dimensional space modeling data comprising a plurality of nodes, said data processing program being executed to perform the steps of:
  receiving said bit stream including said image/audio data and said three dimensional space modeling data comprising a plurality of nodes;
  outputting said three dimensional space modeling data and image/audio data; and
  linking said image/audio data to a node in accordance with information indicating a correlation between said node and said image/audio data, said information indicating the correlation being stream ID information;
  whereby said three dimensional space modeling data, said image/audio data and said stream ID are multiplexed according to a uniform format such that the format of said stream is determined prior to said multiplexing.

39. The recording medium according to the claim 38, wherein said information indicating the correlation is one of said stream ID information expressed by a first expression and character string information corresponding to said stream ID information, said character string information being expressed by a second expression; and wherein said node includes flag information indicating said first or second expression of said information indicating the correlation, said data processing program being further executed to perform the steps of:
  determining an expression of said information indicating the correlation in accordance with said flag information; and
  converting said character string information expressed by said second expression into said stream ID information expressed by said first expression form, wherein said image/audio data is linked to said node in accordance with said stream ID information if said information indicating the correlation is said stream ID information, and said image/audio data is linked to said node in accordance with the converted stream ID information if said information indicating the correlation is said character string information.

40. A recording medium having recorded thereon a data processing program for producing a display image from a stream including a three dimensional space modeling data comprising a plurality of nodes and image/audio data, said data processing program comprising the steps of:
  receiving said stream including said three dimensional space modeling data comprising a plurality of nodes and image/audio data and outputting said three dimensional space modeling data and image/audio data;

converting character string information into stream ID information, said character string information being information indicating a correlation between a node and image/audio data; and linking said image/audio data to said node in accordance with the converted stream ID information;

whereby said three dimensional space modeling data, said image/audio data and said stream ID are multiplexed according to a uniform format such that the format of said stream is determined prior to said multiplexing.

41. A recording medium having recorded thereon a bit stream including three dimensional space modeling data comprising a plurality of nodes and image/audio data designated by position designation information included in the nodes of said three dimensional space modeling data, said bit stream being prepared by the steps of:

extracting position designation information included in a node of said three dimensional space modeling data;

converting the extracted position designation information into stream ID information corresponding to said image/audio data designated by the extracted position designation information;

replacing the position designation information included in said node with said stream ID information; and multiplexing said image/audio data and three dimensional space modeling data including said stream ID data such that said bit stream is produced;

whereby said three dimensional space modeling data, said image/audio data and said stream ID are multiplexed according to a uniform format such that the format of said stream is determined prior to said multiplexing.

42. The recording medium according to claim 41, wherein said bit stream is further prepared by the steps of:

converting said stream ID information into character string information being expressed by a first expression; and determining whether to replace said position designation information included in said node with said stream ID expressed by a second expression or with said character string information expressed by said first expression, wherein said position designation information included in said node is replaced in accordance with the determined result and information representative of the determined expression is inserted in place of the replaced information into said node.

43. A recording medium having recorded thereon a bit stream including three dimensional space modeling data comprising a plurality of nodes and image/audio data designated by position designation information included in the nodes of said three dimensional space modeling data, said bit stream being prepared by the steps of:

extracting position designation information included in a node of said three dimensional space modeling data;

converting the extracted position designation information into stream ID information corresponding to image/audio data designated by the extracted position designation information;

converting said stream ID information into character string information;

replacing said position designation information included in said node with said character string information; and multiplexing said image/audio data and three dimensional space modeling data including said character string information such that said bit stream is produced;

whereby said three dimensional space modeling data, said image/audio data and said stream ID are multiplexed according to a uniform format such that the format of said stream is determined prior to said multiplexing.

44. A recording medium manufactured by a producing device, said recording medium having recorded thereon a signal having a data stream that includes three dimensional space modeling data comprising a plurality of nodes and image/audio data, said recording medium having the recorded signal processed by the steps of:

receiving said data stream including said three dimensional space modeling data comprising the nodes and said image/audio data;

outputting said three dimensional space modeling data and image/audio data; and linking said image/audio data to a node in accordance with information indicating a correlation between said node and image/audio data, said information indicating the correlation being stream ID information;

whereby said three dimensional space modeling data, said image/audio data and said stream ID are multiplexed according to a uniform format such that the format of said stream is determined prior to said multiplexing.

45. The recording medium according to the claim 44, wherein said information indicating the correlation is one of said stream ID information expressed by a first expression and character string information corresponding to said stream ID information, said character string information expressed by a second expression; and wherein said node includes flag information indicating an expression of said information indicating the correlation, said recording medium having the recorded signal further processed by the steps of:

determining an expression of said information indicating the correlation in accordance with said flag information; and converting said character string information expressed by said second expression into said stream ID information expressed by said first expression, wherein said image/audio data is linked to said node in accordance with said stream ID information if said information indicating the correlation is said stream ID information, said image/audio data being linked to said node in accordance with the converted stream ID information if said information indicating the correlation is said character string information.

46. A recording medium producible by a producing device, said recording medium having recorded thereon a signal having a stream including three dimensional space modeling data that comprises a plurality of nodes and image/audio data, said recording medium having the recorded signal processed by the steps of:

receiving said stream including said three dimensional space modeling data comprising the nodes and said image/audio data;

outputting said three dimensional space modeling data and image/audio data;

converting character string information into stream ID information, said character string information being information indicating a correlation between a node and image/audio data; and linking said image/audio data to said node in accordance with the converted stream ID information;

whereby said three dimensional space modeling data, said image/audio data and said stream ID are multiplexed according to a uniform format such that the format of said stream is determined prior to said multiplexing.

47. Apparatus for providing three dimensional space modeling data defined by a plurality of nodes and image/audio data specified by a position included in the nodes, comprising:

a parsing circuit for extracting a respective position from a node of said three dimensional space modeling data;

a converter for converting the extracted position into a stream ID corresponding to image/audio data associated with said position;

an encoder for replacing said position with said stream ID; and a multiplexer for multiplexing said image/audio data and said three dimensional space modeling data including said stream ID such that a bit stream is produced;

whereby said three dimensional space modeling data, said image/audio data and said stream ID are multiplexed according to a uniform format such that the format of said stream is determined prior to said multiplexing.

48. Apparatus for providing three dimensional space modeling data defined by a plurality of nodes and image/audio data specified by a position included in the nodes, comprising:

a parsing circuit for extracting a respective position from a node of said three dimensional space modeling data;

a converter for converting the extracted position into a stream ID corresponding to image/audio data associated with said position;

a changing circuit for converting said stream ID into character string information;

an encoder for replacing said position with said character string; and a multiplexer for multiplexing said image/audio data and said three dimensional space modeling data including said character string such that a bit stream is produced;

whereby said three dimensional space modeling data, said image/audio data and said stream ID are multiplexed according to a uniform format such that the format of said stream is determined prior to said multiplexing.

49. Apparatus for processing a bit stream including image/audio data and three dimensional space modeling data comprising a plurality of nodes to produce a display image, comprising:

a demultiplexer for receiving said bit stream and for demultiplexing the received bit stream into a stream ID, said three dimensional space modeling data and image/audio data; and a reconstruction circuit for providing a correspondence between said image/audio data and a respective node in accordance with said stream ID such that said display image is produced;

whereby said three dimensional space modeling data, said image/audio data and said stream ID are multiplexed according to a uniform format such that the format of said stream is determined prior to said multiplexing.

50. Apparatus for processing a bit stream including image/audio data and three dimensional space modeling data comprising a plurality of nodes to produce a display image, comprising:

a demultiplexer for receiving said bit stream including said image/audio data and said three dimensional space modeling data comprising the nodes and for outputting said three dimensional space modeling data and image/audio data;

a convertor for converting character string information into stream ID information, said character string information being information indicating a correlation between a node and said image/audio data; and a reconstruction circuit for linking said image/audio data and said node in accordance with the converted stream ID information;

whereby said three dimensional space modeling data, said image/audio data and said stream ID are multiplexed according to a uniform format such that the format of said stream is determined prior to said multiplexing.

* * * * *